US009416302B2

(12) United States Patent
Salnikov et al.

(10) Patent No.: US 9,416,302 B2
(45) Date of Patent: *Aug. 16, 2016

(54) POLYBENZOXAZINE COMPOSITION

(71) Applicant: 3M INNOVATIVE PROPERTIES COMPANY, St. Paul, MN (US)

(72) Inventors: Dmitriy Salnikov, Woodbury, MN (US); Ilya Gorodisher, Stillwater, MN (US); Robert J. Webb, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/419,050

(22) PCT Filed: Sep. 24, 2013

(86) PCT No.: PCT/US2013/061273
§ 371 (c)(1),
(2) Date: Feb. 2, 2015

(87) PCT Pub. No.: WO2014/052255
PCT Pub. Date: Apr. 3, 2014

(65) Prior Publication Data
US 2015/0218429 A1   Aug. 6, 2015

Related U.S. Application Data

(60) Provisional application No. 61/706,808, filed on Sep. 28, 2012.

(51) Int. Cl.
| *C09J 179/04* | (2006.01) |
| *C09D 179/04* | (2006.01) |
| *C08G 73/02* | (2006.01) |
| *C08L 51/04* | (2006.01) |
| *C08L 79/02* | (2006.01) |
| *C08L 79/04* | (2006.01) |
| *C08G 65/26* | (2006.01) |
| *C08K 5/357* | (2006.01) |
| *C08G 73/06* | (2006.01) |

(52) U.S. Cl.
CPC .............. *C09J 179/04* (2013.01); *C08G 65/26* (2013.01); *C08G 65/2612* (2013.01); *C08G 65/2627* (2013.01); *C08G 73/0233* (2013.01); *C08L 51/04* (2013.01); *C08L 79/02* (2013.01); *C08L 79/04* (2013.01); *C09D 179/04* (2013.01); *C08G 73/06* (2013.01); *C08K 5/357* (2013.01)

(58) Field of Classification Search
None
See application file for complete search history.

(56) References Cited

U.S. PATENT DOCUMENTS

| 3,018,262 | A | 1/1962 | Schroedar |
| 3,298,998 | A | 1/1967 | McConnell |
| 3,496,250 | A | 2/1970 | Czerwinski |
| 4,118,377 | A | 10/1978 | D'Alelio |
| 5,543,516 | A | 8/1996 | Ishida |
| 6,207,586 | B1 | 3/2001 | Ma |
| 6,207,786 | B1 | 3/2001 | Ishida |
| 6,376,080 | B1 | 4/2002 | Gallo |
| 7,041,772 | B2 | 5/2006 | Aizawa |
| 7,053,138 | B2 | 5/2006 | Magendie |
| 7,517,925 | B2 | 4/2009 | Dershem |
| 8,383,706 | B2 | 2/2013 | Gorodisher |
| 8,389,758 | B2 | 3/2013 | Gorodisher |
| 2011/0054100 | A1 | 3/2011 | Gorodisher |

FOREIGN PATENT DOCUMENTS

| WO | WO 2012-018753 | 2/2012 |
| WO | WO 2012-134731 | 10/2012 |
| WO | WO 2012-135180 | 10/2012 |
| WO | WO 2013-048851 | 4/2013 |

OTHER PUBLICATIONS

Davis, "Sulfur in Amine", Journal of the American Chemical Society, 1962, vol. 84, No. 11, pp. 2085-2090.
Gamlin, "Mechanism and kinetics of the isothermal thermodegradation of ethylene-propylene-diene (EPDM) elastomers", Polymer Degradation and Stability, 2003, No. 80, pp. 525-531.
Ghosh, "Polybenzoxazine-new high performance thermosetting resins: synthesis and properties", Progress. Polymer. Science, 2007, No. 32, pp. 1344-1391.
Ishida, "Handbook of Benzoxazine Resins", 212 (2011).
International Search report for PCT International Application No. PCT/US2013/061273 mailed on Jan. 31, 2014, 3 pages.
Kimura, "New Thermosetting Resin from Bisphenol A-based Benzoxazine and Bisoxazoline", Journal of. Applied. Polymer. Science, 1999, vol. 72, pp. 1551-1558.
Meyer, "Elemental Sulfur",Chemical Reviews, 1976, vol. 76, No. 3, pp. 367-388.
Rimdusit, "Development of New Class of Electronic Packaging Materials Based on Ternary Systems of Benzoxazine, Epoxy, and Phenolic Resins", Polymer, 2000, vol. 41, 7941-7949.

*Primary Examiner* — Jeffrey Mullis
(74) *Attorney, Agent, or Firm* — Kent S. Kokko

(57) ABSTRACT

A polymerizable composition comprising a benzoxazine compound and a catalyst is described. The polymerizable composition may be cured to produce compositions useful in coating, sealants, adhesive and many other applications.

26 Claims, 3 Drawing Sheets

POLYBENZOXAZINE COMPOSITION

CROSS REFERENCE TO RELATED APPLICATIONS

This application is a national stage filing under 35 U.S.C. 371 of PCT/US2013/061273, filed Sep. 24, 2013, which claims priority to Provisional Application No. 61/706,808, filed Sep. 28, 2012.

FIELD OF THE INVENTION

A process of preparing poly(benzoxazines) is described.

BACKGROUND

Benzoxazines and compositions containing benzoxazine are known (see, for example, U.S. Pat. Nos. 5,543,516 and 6,207,786 to Ishida et al.; S. Rimdusit and H. Ishida, "Development of New Class of Electronic Packaging Materials Based on Ternary Systems of Benzoxazine, Epoxy, and Phenolic Resins", Polymer, 41, 7941-49 (2000); and H. Kimura et al., "New Thermosetting Resin from Bisphenol A-based Benzoxazine and Bisoxazoline", J. App. Polym. Sci., 72, 1551-58 (1999).

U.S. Pat. No. 7,517,925 (Dershem et al.) describes benzoxazine compounds and thermosetting resin compositions prepared therefrom. The compositions are said to be useful for increasing adhesion at interfaces within microelectronic packages and low shrinkage on cure and low coefficient of thermal expansion (CTE).

U.S. Pat. No. 7,053,138 (Magendie et al.) describes compositions comprising benzoxazines and thermoplastic or thermoset resins in the manufacture of prepregs and laminates. The compositions are said to yield flame-proofed laminating resins that have high glass transition temperatures.

U.S. Pat. No. 6,376,080 (Gallo) describes a method of preparing a polybenzoxazine which includes heating a molding composition including a benzoxazine and a heterocyclic dicarboxylic acid to a temperature sufficient to cure the molding composition, thereby forming the polybenzoxazine. The compositions are said to have near-zero volume change after post cure.

U.S. Pat. No. 6,207,586 (Ishida et al.) states that the polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. FTIR (Fourier transform infrared) analysis is often used to monitor the conversion of the oxazine rings to polymers to provide an estimate of the rate of polymerization at different temperatures. NMR (nuclear magnetic resonance) spectroscopy can also be used to monitor conversion of benzoxazine monomers to polymer.

Epoxy adhesives have been widely used in structural adhesive applications and satisfy many demanding industrial applications. However epoxies have many noted deficiencies that limit their use including limited high temperature stability, high moisture uptake, shrinkage, and a large exotherm on polymerization.

Polybenzoxazines have been proposed to overcome many of the limitations on epoxies. They have lower exotherms on curing, less shrinkage, have higher thermal stability, low byproducts and may be readily prepared from benzoxazines, which in turn, are readily prepared from an amine, formaldehyde and a phenol in high yields. However, current methods of preparing polybenzoxazines require relatively high temperatures, and typically produce brittle, highly crosslinked polymers.

Efforts to reduce the polymerization temperature have included the addition of various phenols or Lewis acid accelerators, or copolymerization of the benzoxazine with epoxides or other monomers such as phenol-formaldehyde. However the resultant polybenzoxazines-epoxy hybrids retain many of the limitations of the epoxies, and compromise many desirable features thereof, such as epoxy toughness.

SUMMARY

The present disclosure is directed to a polymerizable composition comprising a benzoxazine compound and a catalyst selected from elemental sulfur, elemental selenium, and sulfides or selenides of Group V or VI elements. The polymerizable composition may be cured (polymerized) to produce cured compositions useful in coating, sealants, adhesive and many other applications. The present disclosure further provides a polymerizable composition comprising a benzoxazine compound and catalyst, which when polymerized, is useful in high temperature structural adhesive applications. The present disclosure further provides a method of preparing a polybenzoxazine comprising heating the polymerizable composition at a temperature, and for a time sufficient, to effect polymerization. In some embodiments, a film-former, which may be non-reactive or reactive with the benzoxazine, may be added to the polymerizable composition.

The present disclosure overcomes many of the deficiencies noted for the polymerization of polybenzoxazines including lower polymerization temperatures and reduced exotherms. In some embodiments, the product polybenzoxazines are flexible solids having good thermal stability, and are useful for many industrial applications.

As used herein, the term "benzoxazine" is inclusive of compounds and polymers having the characteristic benzoxazine ring. In the illustrated benzoxazine group, R is the residue of a mono- or polyamine.

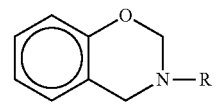

I

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to, methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

As used herein, "aryl" is an aromatic group containing 6-18 ring atoms and can contain fused rings, which may be saturated, unsaturated, or aromatic. Examples of an aryl group include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, "(hetero)hydrocarbyl" is inclusive of (hetero)hydrocarbyl alkyl and aryl groups, and hetero(hetero) hydrocarbyl heteroalkyl and heteroaryl groups, the later comprising one or more catenary oxygen heteroatoms such as ether or amino groups. Hetero(hetero)hydrocarbyl may optionally contain one or more catenary (in-chain) functional groups including ester, amide, urea, urethane and carbonate functional groups. Unless otherwise indicated, the non-polymeric (hetero)hydrocarbyl groups typically contain from 1 to 60 carbon atoms. Some examples of such (hetero)hydrocarbyls as used herein include, but are not limited to, methoxy, ethoxy, propoxy, 4-diphenylaminobutyl, 2-(2'-phenoxyethoxyl)ethyl, 3,6-dioxaheptyl, 3,6-dioxahexyl-6-phenyl, in addition to those described for "alkyl", "heteroalkyl", "aryl" and "heteroaryl" supra.

As used herein, the term "residue" is used to define the (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of hexamethylene diamine, $H_2N$—$C_6H_{12}$—$NH_2$ is the divalent alkyl —$C_6H_{12}$—. The residue of phenylene diamine $H_2N$—$C_6H_4$—$NH_2$, is the divalent aryl —$C_6H_4$—. The residue of diamino-polyethylene glycol, $H_2N$—$(C_2H_4O)_{1-20}$—$C_2H_4$—$NH_2$, is the divalent (hetero)hydrocarbyl polyethylene glycol-$(C_2H_4O)_{1-20}$—$C_2H_4$—.

DETAILED DESCRIPTION

Figure 1:
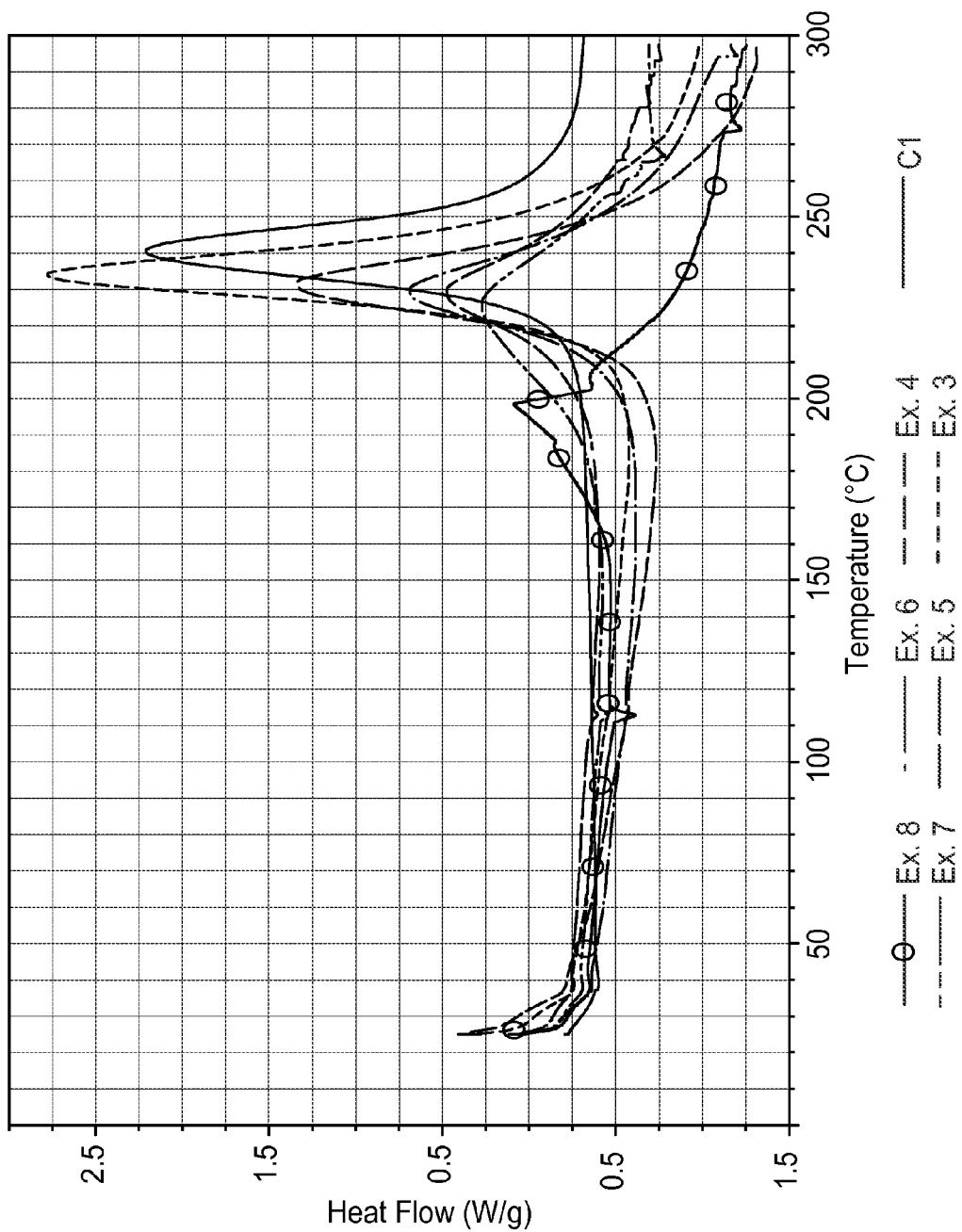
FIG. 1 shows DSC scans depicting elemental sulfur catalyzed cure of benzoxazine and the effect of the benzoxazine to sulfur ratio on the cure profile of Comparative Example 1 and Examples 3-8.

The present disclosure is directed to a polymerizable composition comprising a benzoxazine compound and a catalyst selected from elemental sulfur, elemental selenium, and sulfides or selenides of Group V or VI elements.

In the preparation of the polybenzoxazine, any benzoxazine compound may be used. Benzoxazines may be prepared by combining a phenolic compound, and aliphatic aldehyde, and a primary amine compound. U.S. Pat. No. 5,543,516 (Ishida) and U.S. Pat. No. 7,041,772 (Aizawa et al.) hereby incorporated by reference, describe methods of forming benzoxazines. Other suitable reaction schemes to produce mono-, di- and higher-functional benzoxazines are described in N. N. Ghosh et al., *Polybenzoxazine-new high performance thermosetting resins: synthesis and properties*, Prog. Polym. Sci. 32 (2007), pp. 1344-1391.

One suitable method of producing the starting benzoxazine compounds is illustrated by the following reaction scheme:

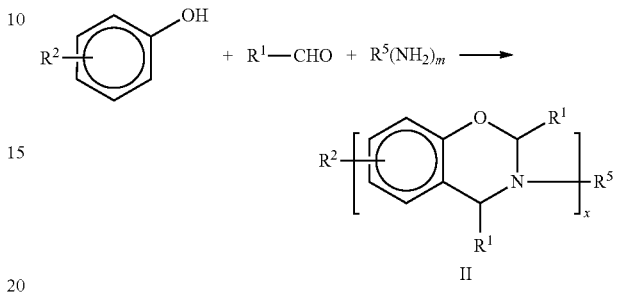

wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound, $R^5(NH_2)_m$, where m is 1-4; and
x is at least 1.

When polymerized, compounds of Formula II undergo ring opening to produce poly(benzoxazine) polymers of the general Formula III and/or IV. Analytical data shows that the poly(benzoxazine) of Formula III predominates.

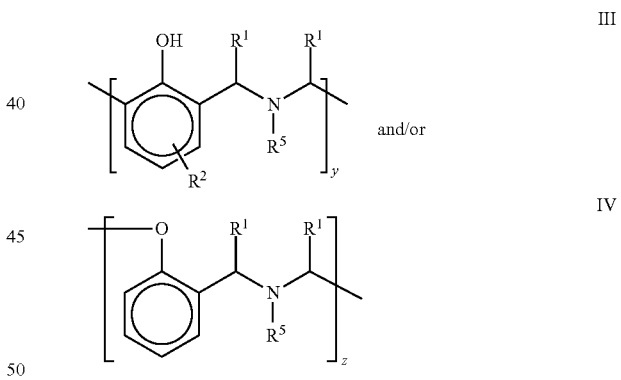

wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound, $R^5(NH_2)_m$, where m is 1-4; and
y and z are at least 2.

A monophenol is illustrated for simplicity. Mono- or polyphenolic compounds may be used. The phenolic compound may be further substituted without limitation is desired. For example, the 3, 4, and 5 positions of the phenolic compound may be hydrogen or substituted with other suitable substituents such as alkyl, cycloalkyl, heterocycloalkyl, aryl, heteroaryl, aralkyl, heteroaralkyl, alkoxy, alkoxyalkylene, hydroxylalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. Desirably at least one of the positions ortho to the hydroxyl group is unsubstituted to facilitate benzoxazine ring formation.

The aryl ring of the phenolic compound may be a phenyl ring as depicted, or may be selected from naphthyl, biphenyl, phenanthryl, and anthracyl. The aryl ring of the phenolic compound may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol; cresol; 2-bromo-4-methylphenol; 2-allyphenol; 4-aminophenol; and the like. Examples of difunctional phenols (polyphenolic compounds) include phenolphthalein; biphenol; 4-4'-methylene-di-phenol; 4-4'-dihydroxybenzophenone; bisphenol-A; 1,8-dihydroxyanthraquinone; 1,6-dihydroxnaphthalene; 2,2'-dihydroxyazobenzene; resorcinol; fluorene bisphenol; and the like. Examples of trifunctional phenols comprise 1,3,5-trihydroxy benzene and the like.

The aldehyde reactants used in preparing the benzoxazine starting materials include formaldehyde; paraformaldehyde; polyoxymethylene; as well as aldehydes having the general formula $R^1CHO$, where $R^1$ is H or an alkyl group, including mixtures of such aldehydes, desirably having from 1 to 12 carbon atoms. The $R^1$ group may be linear or branched, cyclic or acyclic, saturated or unsaturated, or combinations thereof. Other useful aldehydes include crotonaldehyde; acetaldehyde; propionaldehyde; butyraldehyde; and heptaldehyde.

Amino compounds useful in preparing the starting benzoxazine can be substituted or unsubstituted, mono-, di-substituted or higher (hetero)hydrocarbyl amines having at least one primary amine group. The amines may be aliphatic or aromatic amines. It can be substituted, for example, with groups such as alkyl, cycloalkyl, heterocycloalkyl, aryl, heteroaryl, aralkyl, or heteroaralkyl.

Amines useful in the preparation of the starting benzoxazine compounds include those of the formula $R^5(NH_2)_m$ include (hetero)hydrocarbyl monoamines and polyamines. $R^5$ may be a (hetero)hydrocarbyl group that has a valence of m, and is the residue of a mono-, di- or higher amine having at least one primary amine group. $R^5$ can be an alkyl, a cycloalkyl or aryl and m 1 to 4. The $R^5$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen). In some embodiments, $R^5$ is a poly(alkyleneoxy) group, such as a poly(ethyleneoxy), poly(propyleneoxy) or poly(ethyleneoxy-co-propyleneoxy) group.

In one embodiment, $R^5$ comprises a non-polymeric aliphatic, cycloaliphatic, aromatic or alkyl-substituted aromatic moiety having from 1 to 30 carbon atoms. In another embodiment, $R^5$ comprises a polymeric polyoxyalkylene, polyester, polyolefin, poly(meth)acrylate, polystyrene or polysiloxane polymer having pendent or terminal reactive —$NH_2$ groups. Useful polymers include, for example, amine-terminated oligo- and poly-(diaryl)siloxanes and (dialkyl)siloxane amino terminated polyethylenes or polypropylenes, and amino terminated poly(alkylene oxides). Useful polyamines also include polydialkylsiloxanes with pendent or terminal amino groups.

Any primary amine may be employed. Useful monoamines include, for example, methyl-, ethyl-, propyl-, hexyl-, octyl-, dodecyl-, dimethyl-, methyl ethyl-, and aniline. The term "di-, or polyamine," refers to organic compounds containing at least two primary amine groups. Aliphatic, aromatic, cycloaliphatic, and oligomeric di- and polyamines all are considered useful in the practice of the invention. Representative of the classes of useful di- or polyamines are 4,4'-methylene dianiline, 3,9-bis-(3-aminopropyl)-2,4,8,10-tetraoxaspiro[5,5]undecane, and polyoxyethylenediamine. Useful diamines include N-methyl-1,3-propanediamine; N-ethyl-1,2-ethanediamine; 2-(2-aminoethylamino)ethanol; pentaethylenehexaamine; ethylenediamine; N-methylethanolamine; and 1,3-propanediamine.

Examples of useful polyamines include polyamines having at least two amino groups, wherein at least one of the amino groups are primary, and the remaining may be primary, secondary, or a combination thereof. Examples include $H_2N(CH_2CH_2NH)_{1-10}H$, $H_2N(CH_2CH_2CH_2CH_2NH)_{1-10}H$, $H_2N(CH_2CH_2CH_2CH_2CH_2CH_2NH)_{1-10}H$, $H_2N(CH_2)_3NHCH_2CH=CHCH_2NH(CH_2)_3NH_2$, $H_2N(CH_2)_4NH(CH_2)_3NH_2$, $H_2N(CH2)_3NH(CH_2)_4NH(CH_2)_3NH_2$, $H_2N(CH_2)_3NH(CH_2)2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2NH(CH_2)_2NH_2$, and $N(CH_2CH_2NH_2)_3$, and polymeric polyamines such as linear or branched (including dendrimers) homopolymers and copolymers of ethyleneimine (i.e., aziridine). Many such compounds can be obtained, or are available, from general chemical suppliers such as, for example, Aldrich Chemical Company, Milwaukee, Wis. or Pfaltz and Bauer, Inc., Waterbury, Conn.

In some embodiments, benzoxazines derived from aliphatic polyamines, including poly(alkyleneoxy)polyamines, are preferred. As used herein, the phrase "derived from" refers to a structural limitation whereby the benzoxazine contains the residue of a polyamine, not a process limitation. It has been found that the polybenzoxazines derived from aliphatic polyamines are more flexible (as measured by dynamic mechanical analysis, DMA) than those polybenzoxazines derived from aromatic amines, such as aniline. Such aliphatic amine-derived benzoxazines may be copolymerized with aromatic amine derived benzoxazines to provide copolymeric polybenzoxazines.

The aliphatic polyamine may also be provided by a poly(alkyleneoxy)polyamine. The resultant polybenzoxazines contains the residue of a poly(alkyleneoxy)polyamines. Poly(alkyleneoxy)polyamines useful in making benzoxazines for subsequent polymerization can be selected from the following structures:

$H_2N—R^6—O—(R^7O)_p—(R^8O)_q(R^7O)_r—R^6—NH_2$, i.e., poly(alkyleneoxy) diamines); or $[H_2N—R^6O—(R^7O)_p]_s—R^9$, wherein $R^6$, $R^7$ and $R^8$ are alkylene groups having 1 to 10 carbon atoms and may be the same or may be different. Preferably, $R^6$ is an alkyl group having 2 to 4 carbon atoms such as ethyl, n-propyl, isopropyl, n-butyl or isobutyl. Preferably, $R^7$ and $R^8$ are alkyl groups having 2 or 3 carbon atoms such as ethyl, n-propyl or isopropyl. $R^9$ is the residue of a polyol used to prepare the poly(alkyleneoxy)polyamines (i.e., the organic structure that remains if the hydroxyl groups are removed). $R^9$ may be branched or linear, and substituted or unsubstituted (although substituents should not interfere with oxyalkylation reactions).

The value of p is >1, more preferably about >1 to 150, and most preferably about >1 to 20. Structures in which p is 2, 3 or 4 are useful too. The value of q and r are both ≥0. The value of s is >2, more preferably 3 or 4 (so as to provide, respectively, polyoxyalkylene triamines and tetraamines). It is preferred that the values of p, q, r and s be chosen such that the resulting complex is a liquid at room temperature as this simplifies handling and mixing thereof. Usually, the poly(alkyleneoxy)polyamines is itself a liquid. For the polyoxyalkylene, molecular weights of less than about 5,000 may be used, although molecular weights of about 1,000 or less are more preferred, and molecular weights of about 250 to 1,000 are most preferred.

Examples of particularly preferred poly(alkyleneoxy)polyamines include polyethyleneoxidediamine, polypropyleneoxidediamine, polypropyleneoxidetriamine, diethyleneglycolpropylenediamine, triethyleneglycolpropylenediamine, polytetramethyleneoxidediamine, polyethyleneoxide-co-polypropyleneoxidediamine, and polyethyleneoxide-co-polyproyleneoxidetriamine.

Examples of suitable commercially available poly(alkyleneoxy)polyamines include various JEFFAMINES from Huntsman Chemical Company such as the D, ED, and EDR series diamines (e.g., D-400, D-2000, D-5000, ED-600, ED-900, ED-2001, and EDR-148), and the T series triamines (e.g., T-403), as well as H221 from Union Carbide Company.

Many di- and polyamines, such as those just named, are available commercially, for example, those available from Huntsman Chemical, Houston, Tex. The most preferred di- or polyamines include aliphatic di- and triamines or aliphatic di- or polyamines and more specifically compounds with two or three primary amino groups, such as ethylene diamine, hexamethylene diamine, dodecanediamine, and the like. Useful commercial polydialkylsiloxanes having terminal or pendent amine groups include PDMS Diamine 5k, 10k or 15k from 3M Company or Tegomer™ A-Si 2120 or 2130 from Th. Goldschmidt; or DMS™-A11, A12, A15, A25 or A32, AMS™-132, 152, 162, and 232, ATM™-1112 from Gelest; or Rhodosil™ 21643 and 21644, 21642 and 21637 from Rhone-Poulenc.

Other useful amines include amino acids such as glycine, alanine, and leucine and their methyl esters, aminoalcohols such as ethanolamine, 3-aminopropanol, and 4-aminobutanol, polyaminoethers containing ethylene glycol and diethylene glycol (such as Jeffamine™ diamines), and alkenyl amines such as allylamine and butenylamine.

It will be understood that monoamines will cyclize with the aldehyde and phenolic compound to produce mono-benzoxazine compounds, while di- or higher amines will cyclize to produce di- and poly-benzoxazine compounds. For example, a diamine (m=2 in the Scheme VI below) will produce a di-benzoxazine.

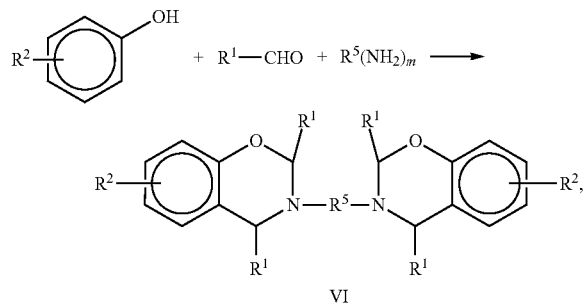

VI wherein each $R^1$ is H or an alkyl group, and is the residue of an aliphatic aldehyde;
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound.

Further, polymeric benzoxazines may be prepared from a polyphenolic compounds, such as bisphenol-A, and a di- or polyamine, which may be further ring-opening polymerized per the method described herein.

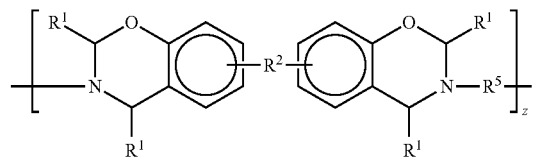

VII wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^4$ is the (hetero)hydrocarbyl residue of a primary amino compound;
$R^5$ is the (hetero)hydrocarbyl residue of a primary amino compound;
z is at least 1, preferably 2 or greater.

In some preferred embodiments, the polymerizable composition comprises benzoxazines derived from aryl amines. In some embodiments, the polymerizable composition comprises benzoxazines derived from aliphatic amines. In some preferred embodiments, the polymerizable composition comprises a mixture of benzoxazines derived from both aliphatic and aryl amines. Preferably, in such embodiments, the aliphatic polyamine is a poly(alkyleoxy) di- or polyamine.

The catalyst of the polymerizable composition is selected from elemental sulfur, elemental selenium, or Group V or VI sulfides or selenides, provided the melting point of the selected added catalyst is lower than the thermal self-catalysis temperature of the benzoxazine employed. For BZ-1 of the Examples, the self-catalysis temperature is approximately 240° C. Any crystalline or amorphous form of elemental sulfur may be used. Elemental sulfur is nominally described as a $S_8$ ring, although other polymers and oligomers are known. Any of the allotropic forms of elemental selenium may be used. Nominally selenium sulfide refers to many different compounds of sulfur and selenium, but is generally given the formula $SeS_2$. Phosphorus sesquisulfide, phosphorus pentasulfide and tetrasulfur tetranitride can be used. The catalyst is generally used in molar amounts of 0.1 to 10%, relative to the amount of benzoxazine. Above this amount, analyses reveals significant degradation of the benzoxazine rings, relative to the amount of poly(benzoxazine) formed. Preferably the catalyst is used in amounts of 0.1 to 5 mole percent, and most preferably, at 0.1 to 2 mole percent.

The polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. B. Meyer, (Chemical Reviews, 1976, vol. 76(3)) reports many reactive species are formed by elemental sulfur in the melt. An ionic mechanism is further suggested by the work of R. E. Davis et al. (J.A.C.S, 84(11) p. 2085, 1962) who reported that elemental sulfur forms charge-transfer complexes in the presence of primary or secondary amines. NMR spectroscopy can be used to monitor conversion of benzoxazine monomers to polymers or general Formulas III and/or IV. as is known, a mixture of phenoxy and phenolic repeat units may result. The residue of the catalyst may be detected in the matrix of the polymer. No evidence of incorporation of sulfur into the polymer has been noted.

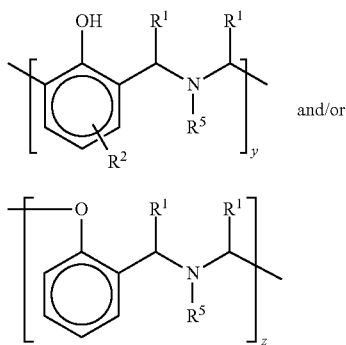

wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound, $R^5(NH_2)_m$, where m is 1-4; and
y and z are at least 2.

Reaction conditions for curing the composition depend on the reactants and amounts used and can be determined by those skilled in the art. The polymerizable compositions are made by mixing in any order the benzoxazine compound and the catalyst described above with any optional compounds, oligomers or polymers. Generally, the composition is then heated to a temperature between about 50 and 200° C., preferably between about 130-180° C., for a time of about 1-120 minutes. In many embodiments the mixture is heated to a first temperature in excess of the melting point of the benzoxazine forming a homogeneous mixture, wherein the catalyst dissolves in molten benzoxazine, then to a second, higher, onset temperature where polymerization to a poly(benzoxazine) ensues. Normally the polymerization is done in the absence of solvent.

Suitable sources of heat to cure the compositions of the invention include induction heating coils, ovens, hot plates, heat guns, infrared sources including lasers, microwave sources. Suitable sources of light and radiation include ultraviolet light sources, visible light sources, and electron beam sources.

In some embodiment the polymerizable composition may further comprise a film-former, which may include reactive diluents, tougheners and film-forming polymers. These materials, as the name suggests, enable the formation of benzoxazine-containing films. Such films are preferably flexible and tacky over a desired temperature window in the sub-ambient to benzoxazine-cure temperature range. The film-former may be non-reactive to the benzoxazine or catalyst, or may be reactive therewith.

In some embodiments the film-formers are oligomers or polymers that form a homogenous mixture with the benzoxazine/catalyst mixtures at processing temperatures, preferably from sub-ambient to the processing of the polymerizable benzoxazine composition. Catalyst present in these films provides for excellent shelf life even when the films are stored at elevated temperatures.

Optionally, film formers can have reactive functional groups that react with a portion of the benzoxazine. Examples of such reactive functional groups include, but are not limited to, amines, thiols, alcohols, epoxides and vinyls. In some embodiments the toughener or reactive diluent may comprise reactive end groups. The presence of such functional groups can afford increased processability options for said films: they can be processed above or below the reaction temperature of the reactive group to afford variable degree of tack, flexibility, and other desirable properties. Examples of such reactive film formers include, but are not limited to amine-terminated butadiene-nitrile (ATBN), hydroxy-terminated butadiene-nitrile (HOTBN), carboxy-terminated butadiene-nitrile CTBN, amine-terminated poly(alkylene oxides) (such as Jeffamine™ and Versalink™) and related compounds.

In some embodiment the reactive film-formers may have different reactive groups in its backbone and termini. Examples of such materials include the end-functional butadiene-nitrile rubbers such as ATBN, which has unsaturation in its repeat unit and amine functional reactive groups on its ends. The amine functional groups may react with the benzoxazine by nucleophilic ring-opening, and the unsaturation may react with the catalyst by vulcanization.

As described, the polymerizable composition may further comprise a toughening agent. The toughening agents which are useful in the present invention are polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell; and elastomeric particles polymerized in situ in the epoxide from free radical polymerizable monomers and a copolymerizable polymeric stabilizer.

Examples of useful toughening agents of the first type include graft copolymers having a polymerized, diene, rubbery backbone or core to which is grafted a shell of an acrylic acid ester or methacrylic acid ester, monovinyl aromatic hydrocarbon, or a mixture thereof, such as disclosed in U.S. Pat. No. 3,496,250 (Czerwinski), incorporated herein by reference. Preferable rubbery backbones comprise polymerized butadiene or a polymerized mixture of butadiene and styrene. Preferable shells comprising polymerized methacrylic acid esters are lower alkyl ($C_1$-$C_4$) substituted methacrylates. Preferable monovinyl aromatic hydrocarbons are styrene, alphamethylstyrene, vinyltoluene, vinylxylene, ethylvinylbenzene, isopropylstyrene, chlorostyrene, dichlorostyrene, and ethylchlorostyrene. It is important that the graft copolymer contain no functional groups that would poison the catalyst.

Examples of useful toughening agents of the second type are acrylate core-shell graft copolymers wherein the core or backbone is a polyacrylate polymer having a glass transition temperature below about 0° C., such as polybutyl acrylate or polyisooctyl acrylate to which is grafted a polymethacrylate polymer (shell) having a glass transition above about 25° C., such as polymethylmethacrylate.

The third class of toughening agents useful in the invention comprises elastomeric particles that have a glass transition temperature ($T_g$) below about 25° C. before mixing with the other components of the composition. These elastomeric particles are polymerized from free radical polymerizable monomers and a copolymerizable polymeric stabilizer that is soluble in the benzoxazine. The free radical polymerizable monomers are ethylenically unsaturated monomers or diisocyanates combined with coreactive difunctional hydrogen compounds such as diols, diamines, and alkanolamines.

Useful toughening agents include core/shell polymers such as methacrylate-butadiene-styrene (MBS) copolymer wherein the core is crosslinked styrene/butadiene rubber and the shell is polymethylacrylate (for example, ACRYLOID KM653 and KM680, available from Rohm and Haas, Philadelphia, Pa.), those having a core comprising polybutadiene and a shell comprising poly(methyl methacrylate) (for example, KANE ACE M511, M521, B11A, B22, B31, and M901 available from Kaneka Corporation, Houston, Tex. and CLEARSTRENGTH C223 available from ATOFINA, Philadelphia, Pa.), those having a polysiloxane core and a polyacrylate shell (for example, CLEARSTRENGTH S-2001 available from ATOFINA and GENIOPERL P22 available from Wacker-Chemie GmbH, Wacker Silicones, Munich, Germany), those having a polyacrylate core and a poly(methyl methacrylate) shell (for example, PARALOID EXL2330 available from Rohm and Haas and STAPHYLOID AC3355 and AC3395 available from Takeda Chemical Company, Osaka, Japan), those having an MBS core and a poly(methyl methacrylate) shell (for example, PARALOID EXL2691A, EXL2691, and EXL2655 available from Rohm and Haas); and the like; and mixtures thereof. Preferred modifiers include the above-listed ACRYLOID and PARALOID modifiers; and the like; and mixtures thereof.

As used above, for acrylic core/shell materials "core" will be understood to be acrylic polymer having $T_g<0°$ C. and "shell" will be understood to be an acrylic polymer having $T_g>25°$ C.

Other useful toughening agents include: carboxylated and amine terminated acrylonitrile/butadiene vulcanizable elastomer precursors such as Hycar™ CTBN 1300X8 and ATBN 1300X16 and Hycar™ 1072 from B. F. Goodrich Chemical Co.; butadiene polymer such as Hycar™ CTB; amine functional polyethers such as HCl 101 (i.e., polytetramethylene oxide diamine) a 10,000 MW, primary amine-terminated, compound from Minnesota Mining and Manufacturing Co.; St. Paul, Minn., and Jeffamine™ from Huntsman Chemical Co. in Houston, Tex.; functional acrylic rubbers including acrylic core/shell material, such as Acryloid™ KM330 and 334 from Rohm & Haas; and core/shell polymers, such as methacrylate-butadiene-styrene (MBS) copolymer wherein the core is crosslinked styrene/butadiene rubber and the shell is polymethylacrylate (e.g., Acryloid™ KM653 and KM680; Rohm and Haas). Useful liquid poly-butadiene hydroxyl terminated resins include those sold under the trade names "Liquiflex H" by Petroflex of Wilmington, Del. and "HT 45" by Sartomer of Exton, Pa.

Tougheners may include epoxy-terminated compounds, which can be incorporated into the polymer backbone. A typical, preferred, list of tougheners includes: acrylic core/shell polymers; styrene-butadiene/methacrylate core/shell polymers; polyether polymers; carboxylated acrylonitrile/butadienes; and, carboxylated butadienes. Advantages can be obtained from the provision of the chain extension agent in a composition with an epoxy resin even in the absence of a toughening agent as described above. However, particular advantage is achieved from the presence of the toughening agent or combinations of different agents, as previously suggested. It is a feature of the present invention that improved resins as disclosed herein are generally made particularly susceptible to, or are enhanced with respect to, the beneficial effects of tougheners.

The toughening agent is useful in an amount equal to about 3-35%, preferably about 5-25%, based on the weight of the benzoxazine. The toughening agents of the instant invention add strength to the composition after curing without reacting with the benzoxazine or interfering with curing.

It will be appreciated that some of the described natural and synthetic rubbers will having unsaturation in the chain that can be crosslinked be the catalyst. Thus, the catalyst will polymerize the benzoxazine, and concurrently vulcanize the rubber to for a co-extensive network of poly(benzoxazine) and vulcanized rubber.

In some embodiment the polymerizable composition may further comprise a reactive diluent having at least one nucleophilic functional group that ring-opens the benzoxazine. The nucleophilic compound is of the generally formula:

$$R^8—(ZH)_p,\qquad\qquad XV$$

where $R^8$ is the (hetero)hydrocarbyl group,

Z is or —S—, or —NR$^9$, where R$^9$ is H or a hydrocarbyl group, including aryl and alkyl, and p is 1 to 6, preferably at least 2.

The ring-opening reaction may be represented by the following Schemes XX and XXI:

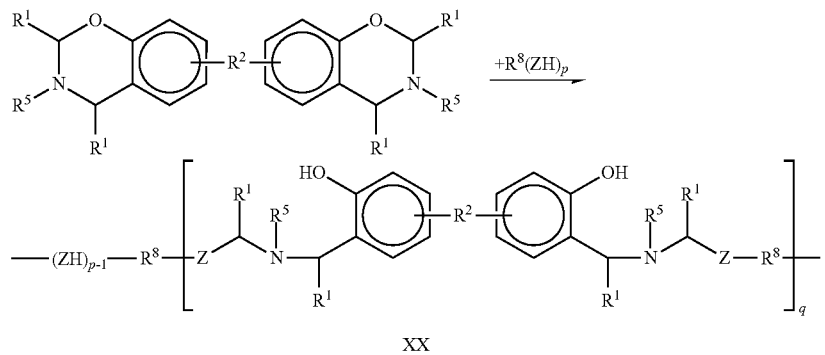

XX

Or

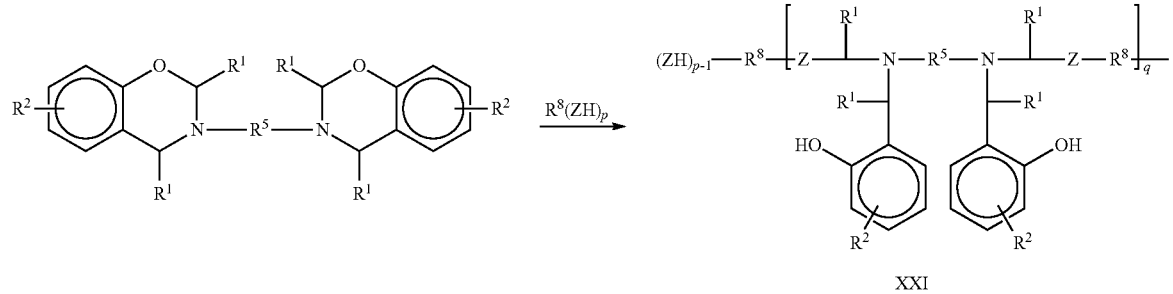

XXI where
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound
$R^8$ is the (hetero)hydrocarbyl group,
Z is a mixture of —S— or —$NR^9$, where each $R^9$ is H or a hydrocarbyl group, including aryl and alkyl,
p is 1 to 6;
q is the number of repeat unit and is at least 1, preferably at least 2.

Note that Schemes XX and XXI, and other schemes herein, the product depicts a mixture of free thiol and/or amine groups "Z". The depiction is used to account for all the Z groups present in the starting materials, which are available for subsequent reaction. Thus the starting bis-benzoxazine reacts with the mixture of the amine compound and/or the thiol $R^4(SH)$—, and the initial reaction product has "n-1" Z groups, which may be available for further reaction with additional benzoxazine groups. Further, in embodiments where the starting benzoxazine was prepared with a polyamine, $R^5$ groups may be connected to additional benzoxazine groups. Note further that as the composition comprises at least one polyfunctional thiol compound or amine compound, polymeric reaction products result.

In these embodiments there is an excess of benzoxazine, as an unreacted benzoxazine will homopolymerize in the presence of the catalyst to form a coextensive mixture or polymer network of benzoxazine adducts with the reactive diluent of Formula XV and poly(benzoxazines). In such embodiments, the molar amounts ratio of benzoxazine groups to the sum of amine and/or thiol "Z" groups from the compound $R^8$—$(ZH)_p$, is about 3:1 to 100:1, preferably 4:1 to 50:1.

With reference to the reactive diluent $R^8$—$(ZH)_p$, the benzoxazine ring may be ring-opened by an amine compound. Useful amine compounds correspond to primary and secondary amines of the formula:

$$R^{10}(NHR^9)_m, \quad \quad \text{XII}$$

and include primary and secondary (hetero)hydrocarbyl monoamines and polyamines. $R^{10}$ may be (hetero)hydrocarbyl group that has a valence of m, and is the residue of a mono-, di- or higher amine having at least one primary amine group. $R^{10}$ can be an alkyl, a cycloalkyl or aryl and m 1 to 4. The $R^{10}$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen. Each $R^9$ is independently H or a hydrocarbyl group, including aryl and alkyl, and m is 1 to 6. It will be clear to one skilled in the art that the same amines used in the preparation of the benzoxazines (supra) will also be useful in the ring-opening reaction.

The benzoxazine ring may also be opened with thiols of the formula:

$$R^4(SH)—, \quad \quad \text{VII}$$

where n is 1 to 6. $R^4$ includes any (hetero)hydrocarbyl groups, including aliphatic and aromatic monothiols and polythiols. $R^4$ may optionally further include one or more functional groups including hydroxyl, acid, ester, cyano, urea, urethane and ether groups.

In some preferred embodiments, the thiol compounds are of the formula:

$$R^6—[(CO_2)_x—R^7—SH]_y, \quad \quad \text{VIII}$$

where $R^6$ is an alkylene group, an aryl group, an oxyalkylene group, or combination thereof, $R^7$ is a divalent hydrocarbyl group, x is 0 or 1,
y is 1 to 6.

Useful thiol compounds falling within the scope of Formula VII include thiols is of the formulas:

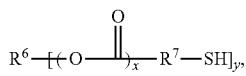
IX

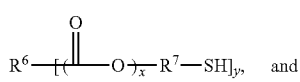
X

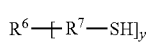 and
XI wherein
$R^6$ is an alkylene group, an aryl group, an oxyalkylene group, or combination thereof,
$R^7$ is a divalent hydrocarbyl group,
x is 0 or 1,
y is 1 to 6. Preferably the compounds of Formulas IX to XI are those in which $R^6$ is an alkylene group.

Useful alkyl thiols include methyl, ethyl and butyl thiol, as well as 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, mercaptoalkanoic acids and esters thereof including mercaptoproionic acid, 2-chloroethanethiol, 2-amino-3-mercaptopropionic acid, dodecyl mercaptan, thiophenol, 2-mercaptoethyl ether, and pentaerythritol tetrathioglycolate. Specific examples of useful polythiols include dimercaptodiethyl sulfide; 1,6-hexanedithiol; 1,8-dimercapto-3,6-dithiaoctane; propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Another useful class of polythiols includes those obtained by esterification of a polyol with a terminally thiol-substituted carboxylic acid (or derivative thereof such as esters or acyl halides) including α- or β-mercaptocarboxylic acids such as thioglycolic acid or β-mercaptopropionic acid or esters thereof. Useful examples of compounds thus obtained include ethylene glycol bis(thioglycolate), pentaerythritol tetrakis(3-mercaptopropionate), ethylene glycol bis(3-mercaptopropionate), trimethylolpropane tris(thioglycolate), trimethylolpropane tris(3-mercaptopropionate), pentaerythritol tetrakis(thioglycolate) pentaerythritol tetrakis(3-mercaptopropionate), all of which are commercially available. A specific example of a preferred polymeric polythiol is polypropylene ether glycol bis(3-mercaptopropionate) which is prepared from polypropylene-ether glycol (e.g. Pluracol™ P201, BASF Wyandotte Chemical Corp.) and 3-mercaptopropionic acid by esterification.

In some embodiments, useful thiols include those thiols derived from epoxy compounds. The polythiol may be derived from the reaction between $H_2S$ (or equivalent) and an epoxy resin having two or more functional groups and preferably having a molecular weight of less than 1000. For example, bifunctional epoxy resins, such as a bisphenol A epoxy resin and a bisphenol F epoxy resin, and novolak epoxy resins, such as a phenolic novolak epoxy resin and a cresol novolak epoxy resin, or amine epoxy resins, can be used. In addition, generally known polyfunctional epoxy resins, heterocycle-containing epoxy resins, and alicyclic epoxy resins can be used. These epoxy resins may be used alone or in combinations of two or more chemical types or molecular weight ranges.

A particularly useful polythiol is that derived from bisphenol-A diglycidyl ether, available as QX-11 from Japan Epoxy Resins, having a thiol equivalent weight of ~245 and the following general structure, where n is at least 1:

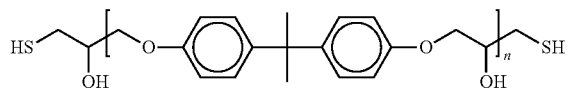

Useful soluble, high molecular weight thiols include polyethylene glycol di(2-mercaptoacetate), LP-3™ resins supplied by LP North America. (Houston, Tex.), and Permapol P3™ resins supplied by Products Research & Chemical Corp. (Glendale, Calif.) and compounds such as the adduct of 2-mercaptoethylamine and caprolactam.

The compounds of Schemes XX and XXI may be prepared by combining the benzoxazine compounds, the reactive diluents of Formula XV neat or in a suitable solvent. Suitable solvents include those in which the reactants dissolve, preferably at room temperature. Solvents may include that is non-reactive with the reactants and that provides for the subsequent dissolution of co-reactants. Examples of suitable solvents include butyl acetate, toluene, xylene, tetrahydrofuran, ethylene glycol dimethyl ether and the like. Heating is generally unnecessary as the thiol and amine-induced ring opening is exothermic.

The reactive diluent may comprise an epoxy resin. The epoxy group does not react directly with the benzoxazine as do the amines or thiols, but the phenolic group resulting from the ring opening of the benzoxazine may further react to ring-open the epoxy groups.

Polyepoxy compounds which can be utilized in the composition of the invention include both aliphatic and aromatic polyepoxides, but glycidyl aliphatic epoxides are preferred. The aromatic polyepoxides are compounds containing at least one aromatic ring structure, e.g. a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins) and the glycidyl esters of aromatic carboxylic acids. The most preferred aromatic polyepoxides are the polyglycidyl ethers of polyhydric phenols.

Representative examples of aliphatic polyepoxides which can be utilized in the composition of the invention include 3',4'-epoxycyclohexylmethyl-3,4-epoxycyclohexanecarboxylate, 3,4-epoxycyclohexyloxirane, 2-(3',4'-epoxycyclohexyl)-5, IH-spiro-3H4H-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

Representative examples of aromatic polyepoxides which can be utilized in the composition of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-(4-(2,3-epoxypropoxy)phenylpropane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,31-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. Nos. 3,018,262 and 3,298,998, as well as the derivatives described in the Handbook of Epoxy Resins by Lee and Neville, McGraw-Hill Book Co., New York (1967), and mixtures thereof.

A preferred class of polyepoxy compounds are polyglycidyl ethers of polyhydric alcohol, particularly polyphenols. The glycidyl epoxy compounds are generally more reactive toward amines than cycloaliphatic epoxy compounds. In some preferred embodiments, the epoxy compound generally has an epoxy equivalent weight (EW) of between 170 to about 4,000, preferably between 170 and 1,000. The epoxide equivalent weight (EW) is defined as the weight in grams of the epoxy functional compound that contains one gram equivalent of epoxy (oxirane) functional groups.

The polymerizable composition may further include a film-forming polymer. When a coating formulation comprising a mixture of film-forming polymer, the benzoxazine, sulfur catalyst and an optional solvent is applied to a substrate, solvent evaporates, and the polymer particles coalesce to form a continuous film with benzoxazine, catalyst and other optional additions are dissolved or dispersed in the film-forming polymer matrix. Coating formulations are typically applied, dried, and optionally heated, leaving the finished product with a solid coating. The addition of surfactants may improve the film forming properties of some formulations by improving the ability of the coating to wet the substrate and/or by allowing for even evaporation of solvent (i.e., leveling) during film formation. The film forming polymer may be used in amount of 1-75, preferably 10-50 wt. %, relative to the benzoxazine.

Examples of suitable film-forming polymers for coating formulations include acrylic polymers (e.g., poly(methyl methacrylate-co-ethyl acrylate) and poly(methyl acrylate-co-acrylic acid)); polyurethanes (e.g., reaction products of aliphatic, cycloaliphatic or aromatic diisocyanates with polyester glycols or polyether glycols); polyolefins, (e.g., polystyrene); copolymers of styrene with acrylate(s) (e.g., poly(styrene-co-butyl acrylate); polyesters, (e.g., polyethylene terephthalate, polyethylene terephthalate isophthalate, and polycaprolactone); polyamides, (e.g., polyhexamethylene adipamide); vinyl polymers, (e.g., poly(vinyl acetate/methyl acrylate) and poly(vinylidene chloride/vinyl acetate); polydienes, (e.g., poly(butadiene/styrene)); cellulosic derivatives including cellulose ethers and cellulose esters, (e.g., ethyl cellulose and cellulose acetate/butyrate), polyimides, polysulfones and urethane-acrylate copolymers. Such polymers are available, for example, from commercial sources or may be prepared using methods and starting materials known in the art.

Compositions of this invention are useful for coatings, foams, shaped articles, adhesives (including structural and semistructural adhesives), magnetic media, filled or reinforced composites, coated abrasives, caulking and sealing compounds, casting and molding compounds, potting and encapsulating compounds, impregnating and coating compounds, conductive adhesives for electronics, protective coatings for electronics, and other applications that are known to those skilled in the art. When uncured or partially cured, the benzoxazine compositions exhibit pressure-sensitive adhesive properties, including tack. In some embodiments, the present disclosure provides a coated article comprising a substrate, having a cured coating of the benzoxazine thereon.

To prepare a structural/semi-structural benzoxazine adhesive, the polymerizable composition could contain additional adjuvants such as silica fillers, glass bubbles and tougheners. These adjuvants add toughness to and reduce the density of the polymerized composition.

In some embodiments, the present disclosure provides "B-stagable" adhesives. Processing applications such as printed circuit manufacture often employ "stageable" adhesives, that is, adhesive compositions which can be partially polymerized to a tacky or tack-free coating, fastened to an adherend, and cured using heat, pressure, or both (see. U.S. Pat. No. 4,118,377). The tack-free state is sometimes referred to as the "B-Stage".

The present disclosure provides stageable adhesive compositions comprising benzoxazine compounds, a film-former having a reactive functional group and the catalyst. The stageable adhesive composition may be coated on to an adherend or substrate, and fully cured to a structural or semistructural adhesive using heat.

In one embodiment the B-stageable adhesive comprises the benzoxazine, the reactive diluent of Formula XV and the catalyst. At a first temperature the reactive diluent ring-opens a portion of the benzoxazine to form the adduct. At a second, higher temperature the curing to the poly(benzoxazine) is effected by the catalyst.

In another embodiment, the B-stageable adhesive comprises the benzoxazine, the toughener having reactive functional groups (such as ATBN) and the catalyst. At a first temperature the toughener ring-opens a portion of the benzoxazine to form the adduct. At a second, higher temperature the curing to the poly(benzoxazine) is caused by the catalyst. In some embodiments where the toughener further comprises chain unsaturation, the catalyst may vulcanize the toughener.

In some embodiments, the partially cured, stageable adhesive composition may be disposed between two substrates (or adherends), and subsequently heated to fully cure the adhesive and effect a structural or semistructual bond between the substrates. In other embodiments, the stageable adhesive composition may be heated to a flowable viscosity to effect coating of a substrate, which may then be joined to a second substrate while still molten and full curing effected.

B-stageable films are typically prepared by heating up benzoxazine to its melting point and dissolving the desired amount of catalyst in it. Sometimes it may be necessary to further heat the composition to near the melting point of the catalyst to ensure desired solubility. The film-former, heated to the desired compounding temperature, is then added and stirred into the benzoxazine/catalyst mixture until uniform, and the resultant composition is then pulled through a knife coater between release liners at optionally elevated temperature to produce a film of desired thickness.

Therefore the present disclosure provides stageable, structural and semi-structural adhesives. "Semi-structural adhesives" are those cured adhesives that have an overlap shear strength of at least about 0.5 MPa, more preferably at least about 1.0 MPa, and most preferably at least about 1.5 MPa. Those cured adhesives having particularly high overlap shear strength, however, are referred to as structural adhesives. "Structural adhesives" are those cured adhesives that have an overlap shear strength of at least about 3.5 MPa, more preferably at least about 5 MPa, and most preferably at least about 7 MPa.

To prepare protective coatings, the choice of materials depends on the needs of the specific application. Abrasion resistant coatings are generally hard and require a significant portion of the formulation to be a hard resin, which are generally short chain length and have high functionality. Coatings undergoing some flex require toughness which can be obtained by lowering the crosslink density of the cure formulation. Clear coatings require the cured resins to have little to no phase separation. This is obtained by controlling the compatibility of the resins or controlling phase separation by cure rate. Adjuvants could be added to these coating formulations in an amount effective for their intended use.

Adjuvants may optionally be added to the compositions such as colorants, abrasive granules, anti-oxidant stabilizers, thermal degradation stabilizers, light stabilizers, conductive particles, tackifiers, flow agents, bodying agents, flatting agents, inert fillers, binders, blowing agents, fungicides, bactericides, surfactants, plasticizers, rubber tougheners and other additives known to those skilled in the art. They also can be substantially unreactive, such as fillers, both inorganic and organic. These adjuvants, if present, are added in an amount effective for their intended purpose.

The composition may be coated onto substrates at useful thicknesses ranging from 25-500 micrometers or more. Coating can be accomplished by any conventional means such as roller, dip, knife, or extrusion coating. Solutions of the polymerizable composition may be used to facilitate coating. Stable thicknesses are necessary to maintain the desired coating thickness prior to crosslinking of the composition to form the crosslinked composition.

Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as polymethyl (meth)acrylate), polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood and composites of the foregoing materials.

The instant disclosure further provides a pressure-sensitive adhesive which comprises a coating of the uncured or partially cured benzoxazine composition on a suitable substrate, such as an adhesive tape backing. A preferred method of preparing a pressure-sensitive adhesive article comprises partially curing the novel composition to a useful coating viscosity, coating the partially crosslinked composition onto a substrate (such as a tape backing) and further curing the composition. Useful coating viscosities are generally in the range of 500 to 10,000 cps.

EXAMPLES

All parts, percentages, ratios, etc. in the examples are by weight, unless noted otherwise.

The amounts of the catalysts for the adhesives were determined by equivalents (eq) based on the moles of reactive groups per mole of reactant molecule, e.g., 2 eq of a bifunctional reactant represents one mole of that reactant, and one mole of a trifunctional reactant would represent 3 eq of that reactant. Catalysts are treated as if monofunctional.

The double dash designation in the tables indicates that the sample was not tested.

Unless otherwise stated, materials were obtained from Sigma-Aldrich, Milwaukee, Wis.

Test Methods

Differential Scanning Calorimetry of Cure (DSC Analysis)

The thermal properties of a composition during curing were determined by placing an amount of the composition in an open aluminum pan in a Differential Scanning calorimeter (DSC) and heating from 25° C. to 300° C. or 320° C. at a heating rate of 10° C./min. The DSC from TA Instruments, New Castle, Del., is designated (TA) and the DSC from Seiko Instruments USA, Inc., Torrance, Calif. is designated (Seiko). The peak cure temperature in ° C. (Peak), the approximate cure onset temperature in ° C. (Onset), and the total energy released (Energy) in Joules/gram (J/g) during curing of the composition from the DSC trace are reported.

Nuclear Magnetic Resonance (NMR Analysis)

Nuclear magnetic resonance spectra ($^{13}C$ NMR, $^1H$ NMR, and $^{77}Se$ NMR) were determined using an NMR spectrometer (Varian Inova 600 MHz NMR spectrometer equipped with an inverse probe head with the NMR sample held at 25° C.). The NMR provided information that is an indication of the curing of the polymer, and an indication of whether or not the catalyst was incorporated into the polymer chain.

Dynamic Mechanical Analysis (DMA)

Test coupons were prepared for dynamic mechanical testing by using a mold placed between two silicone release-coated PET films. The mold was approximately 1.5 mm thick and formed of silicon rubber having rectangular cutouts (approximately 5 mm wide×30 mm long) in it. A composition for testing was cast into the cutouts of the mold on top of a PET film. The second PET film was placed over the filled mold to form an assembly. The assembly was clamped between two glass plates and allowed to cure at 100° C. for 60 minutes, followed by 60 minutes at 180° C. The clamped assembly was then allowed to cool to room temperature. The coupons were removed and tested in a dynamic mechanical analyzer (DMA; Seiko DMS-200, Seiko) in tensile mode heated at 2° C./minute in a temperature range between −80° C. and 320° C. The DMA trace from the DMA scan provides insight into the morphological and viscoelastic properties, e.g. loss tangent, of a polymer when a stress is applied to it during thermocycling. The data also provides information on the thermal stability of the polymer.

Determination of Shrinkage

A half-pipe steel mold measuring 25.4 cm long and 2.54 dm in diameter and coated with a silicone release coating was used to determine shrinkage of a composition after curing. The mold was preheated to 100° C., and filled with a curable composition. The mold was then placed in an oven set at 180° C. for two hours. The mold was removed from the oven and allowed to cool to room temperature. The cured polymeric bar was removed and measured with a caliper to determine the amount of shrinkage in the cured bar.

Thermogravimetric Analysis (TGA)

The thermal stability of the amine cured epoxy-benzoxazine compositions was determined by isothermal weight loss studies using thermogravimetric analysis (TGA) techniques. A 5-10 mg samples of the composition was placed in an thermogravimetric analyzer (TA 2950 Thermogravimetric Analyzer), and isothermally annealed at 300° C., 325° C., 350° C., 375° C. and 400° C. The sample was annealed for sufficient times to reach 2.5%, 5% and 10% mass loss.

See for reference Clint D. Gamlin, Naba K. Dutta, Namita Roy Choudhury, *Polymer Degradation and Stability* 80 (2003) pp 525-531

The data from the TGA scan was analyzed according to the Arrhenius equation in which the the logarithm of the rate of a thermal decomposition reaction, is proportional to the inverse of temperature. The mass loss during the isothermal temperature holds was assumed to be due to a single reaction (or a number of similar reactions), the plot of logarithm of the rate of the mass loss (log [change in weight/change in temperature]) vs inverse of temperature (1/T [° K]) produced a straight line with a slope given by R*Ea, where R is the universal gas constant and Ea is the activation energy of thermal degradation. The higher the slope, the larger the activation energy required to decompose the polymer, the more stable the polymer.

Preparation of Test Substrates for Adhesive Bonding Properties

Substrates for testing of adhesive properties (Overlap Shear Strength (OLS) and Floating Roller Peel (FRP)) were 2024 T3 bare aluminum test panels. Aluminum panels measuring 4 in×7 in×0.063 in (10 cm×18 cm×0.16 cm) were used for OLS testing. Panels measuring either 8 in×3 in×0.063 in (20.3 cm×7.6 cm×0.16 cm), or 10 in×3 in×0.025 in (25.4 cm×7.6×0.064 cm) were used for FRP testing. The panels were treated with an FPL etch, anodized with phosphoric acid, and primed as described below.

The panels were FPL etched according to the following process:

Panels were soaked for 10-11 minutes in a caustic wash solution (Isoprep 44 solution from MacDermid Inc., Denver, Colo.), at a temperature of 71±10° C.

Panels were placed in a rack and submerged in a tank of tap water for 10 minutes;

Panels were spray rinsed with tap water for 2-3 minutes;

The rake of panels were placed in a tank of FPL etch solution (FPL solution of sulfuric acid and sodium dichromate from Forest Products Laboratory, Madison, Wis.) at 71±10° C. for 10-15 minutes;

The etched panels were spray rinsed with tap water for 2-3 minutes.

The rack of panels was then anodized by submerging into an anodizing tank of phosphoric acid. The panels were anodized at a voltage of 15±1 volts for 23 minutes at a tank temperature of 67-82° F. The panels were drip dried for 10 minutes at ambient temperature, and then for 30 minutes in a re-circulating air oven at 71° C.

The etched and anodized aluminum panels were primed within 24 hours of treatment with a corrosion inhibiting bonding primer for aluminum (3M Scotch-Weld™ Structural Adhesive Primer EW-5000, 3M Company, St. Paul, Minn.) according to the manufacturer's instructions using a spray gun (AccuSpray Model 12S spray gun with 1 quart cup) to provide a dried primer thickness of between 2.6 to 5.2 micrometers. The primed panels were dried for 30 minutes at 75±5° F. followed by 60-65 minutes at 250±5° F.

Preparation of Uncured Adhesive Film with Embedded Nonwoven Scrim

An uncured adhesive sheet between two release liners was embedded with a nonwoven scrim as follows. One of the liners was removed and the adhesive was placed on a sheet polyester nonwoven scrim that was slightly larger than the adhesive film. The polyester nonwoven scrim (Polyester nonwoven sheet, basis weight of 0.8 grams/square meter, Technical Fibre Products, Inc.; Schenectady, N.Y.). The liner was replaced on top of the scrim on the adhesive and the sandwich was laminated two heated two rollers set at a temperature of 140° F. (60° C.) using pressure from an air supply with a gauge pressure of 20 psi (137.9 kPa). During lamination, the polyester scrim became embedded in the adhesive between the two release liners.

Overlap Shear Strength (OLS) Test

The adhesive for OLS testing was placed between two 4 in×7 in×0.063 in (10 cm×18 cm×0.16 cm) prepared aluminum panels that overlapped each other by about 6 inches so that approximately 1 inch of panel extended in opposite ends that did not have adhesive on it. This composite pressed together over the adhesive coated portion and cured in an oven at 180° C. or autoclaved as specified below. The cured test panel was cut into 2.54 cm wide strips and positioned in the gripping jaws of a tensile tester (MTS Systems Corporation, Eden Prairie, Minn.). The gap between the jaws of the tester was approximately 5.5 inches (13.97 cm) and each jaw gripped approximately 2.54 cm of each strip. The jaws were separated at a speed of 0.05 inches/minute (1.27 millimeters/minute) using a 30,000 pound-force (13.3 kiloNewtons) load cell until failure occurred. The gripping jaws are positioned inside of an oven after the sample had equilibrated to 75° F. (24° C.), 275° F. (136° C.), or 350° F. (177° C. The test results are an average of six test samples and are reported in pounds per square inch (psi).

Floating Roller Peel (FRP) Test

An uncured adhesive film supported on a scrim was prepared for testing between two prepared aluminum test panels (one 0.16 cm thick and the other 0.064 cm thick) according to ASTM D-3167-76 with the following modification. The test strips measuring 0.5 inch (12.7 cm) wide were cut along the lengthwise direction of the bonded aluminum panels. The test strips were each tested in a tensile testing machine. The thinner substrate was pulled from the thicker one at a peel rate of 6 inches/minute (30.5 cm/minute) and the results were normalized to a width of one inch. The test results are an average of six test samples and are reported in pounds per inch width (piw).

Autoclave Curing for OLS or FRP Testing

The test samples were placed on a curing tray which was covered with a vacuum bag. The covered tray was positioned in an autoclave and a partial vacuum of about 28 inches Hg was applied at approximately 72° F. (22° C.)) for 10 to 15 minutes after which the external autoclave pressure was gradually increased to 45 psi (310 kPa). The vacuum bag was then vented to release the vacuum, and the temperature was raised at 5° F./minute (2.8° C./minute) up to 350° F. (177° C.) and held there for 1 hours. The cured bonded test samples were then cooled at 10° F./minute (5.5° C./minute) to room temperature, at which point the pressure was released, and the cured articles were removed from the autoclave and vacuum bag.

Abbreviations Employed

Solvents and other reagents used were obtained from Sigma-Aldrich Chemical Company; Milwaukee, Wis., unless specified differently.

BZ-1—Araldite 35600 resin, a bisphenol A-benzoxazine from Huntsman Advanced Materials America Inc, The Woodlands Tex.

BZ-2—diphenyl-Jeffamine D400 benzoxazine prepared according to the procedure described in Handbook of Benzoxazine Resins, Elsevier, 2011, p. 212

BZ-3—p-cresyl benzoxazine of aniline prepared according to the procedure described in Handbook of Benzoxazine Resins, Elsevier, 2011, p. 212

HOTBN—hydroxyl terminated partially epoxidized oligo (butadiene), Sigma-Aldrich, Milwaukee, Wis.

ATBN—amine terminated oligo(butadiene-acrylonitrile), Emerald Performance Materials, Akron Ohio Fumed silics—CAB-O-SIL TS-720 fumed silica, Cabot Corporation, Billerica Mass.

$SeS_2$—selenium disulfide, Sigma-Aldrich

Se—selenium Alrich

Nitrile rubber—Nipol 1000x88, Zeon Chemicals, LP; Louisville, Ky.

Zinc oxide—Kadox 930C Zinc Oxide, Horsehead Corporation, Monaca, Pa.

Curative—Santacure CBS, N-cyclohexl-2-benzothiazole-sulfenamide, Flexsys America LP; Akron Ohio Sulfur—ACROCHEM Microfine Wettable MC Sulfur, elemental sulfur; Acrochem Corp. Akron, Ohio Phenolic Resin—Durez 5980 Phenolic resin, Durez Corporation, Addison, Tex.

MEK—methyl ethyl ketone, EMD Chemicals, Inc., Gibbstown, N.J.

MPK/MIBK—methylisopropyl ketone, Eastman Chemical Company, Kingsport, Tenn.

Toluene—EMD Chemicals, Inc., Gibbstown, N.J.

Deuterated chloroform—deuterated chloroform spiked with TMS (tetramethylsilane) Cambridge Isotopes, Andover, Mass.

Release liner—Product #23210, 76# BL KFT H/HP 4D/6MH; Loparex, Iowa City, Iowa

TMMP—Trimethylolpropane tris(3-mercaptoproprionate); Wako Chemical USA, Inc., Richmond, Va.

Example 1

Powders of finely ground BZ-1 (23.1) and sulfur (3.2 grams) were mixed in equimolar ratios, and stirred and shaken for approximately 1 minute in a Wig-L-Bug shaker. Approximately 15.4 milligrams (mg) of the mixture was heated up to 320° C. in a DSC (Seiko) as described above. The DSC trace showed an exotherm with a high temperature peak at approximately 211° C., a cure onset temperature at ~140° C., and the total energy released during curing was 221 J/gram. The trace also showed a minor sharp endotherm with a peak at approximately 113° C., corresponding to the reported melting point of sulfur.

Example 2

BZ-2 (33.3 grams) and finely ground sulfur (3.2 grams) were mixed in equimolar ratios and stirred vigorously for approximately 1 minute. Approximately 20.3 mg of the mixture was heated up to 320° C. in a DSC as described in Example 1. The DSC trace showed an exotherm with dual high temperature peaks at approximately 170° C. and 225° C. and a cure onset temperature at ~130° C. The total energy released during the cure was 221 J/gram. The trace also showed a minor sharp endotherm with a peak at approximately 113° C., corresponding to the reported melting point of sulfur.

Comparative Examples C1-C2

Approximately 4.4 mg of BZ-1 (C1) and approximately 12.0 mg of BZ-2 (C2) were heated up to 320° C. in a DSC as described in Example 1. The DSC traces on each showed the peak exotherm temperatures of 240° C. and 246° C., onset of curing temperatures of 190° C. and 190° C., and energy released during curing of 323 and 113 J/g for C1 and C2 respectively.

Examples 3-8

Comparative Examples C1A

Finely ground powders of BZ-1 and sulfur in various molar ratios (BZ:S ratio) from 10× to 1:1 as shown in Table 1 were prepared as described in Example 1. Also shown are the amounts of each in grams. Approximate amounts of each mixture shown the table were heated up to 300° C. in a DSC (TA).

Example C1A was Example C1 tested in a TA DSC at the same time Examples 3-8. Results from the DSC traces for the peak exotherm temperature (Peak), onset of curing temperature (Onset), and the total energy released during curing (Energy) are shown in Table 1 and FIG. 1.

TABLE 1

| Ex | BZ-1:S Ratio | BZ-1 (g) | S (g) | DSC Amt (mg) | Peak (° C.) | Onset (° C.) | Energy (J/g) |
|---|---|---|---|---|---|---|---|
| C1A | BZ-1 | — | 0 | 4.4 | 240 | 229 | 323 |
| 3 | 10X | 23.1 | 0.32 | 2.01 | 234 | 220 | 485 |
| 4 | 5X | 23.1 | 0.64 | 1.07 | 232 | 213 | 403 |
| 5 | 3.33X | 23.1 | 0.96 | 4.01 | 230 | 204 | 258 |
| 6 | 2.5X | 23.1 | 0.128 | 3.01 | 230 | 208 | 367 |
| 7 | 2X | 23.1 | 0.160 | 3.01 | 227 | 180 | 292 |
| 8 | 1:1 | 23.1 | 3.2 | 8.13 | 198 | 171 | 198 |

Examples 9-11

Molten BZ-3 (2.24 g; 0.01 mol) at 30° C. was mixed with sulfur (0.16 g; 0.005 mol) and the mixture was allowed to react at 170° C. for 1 hour, followed by 14 hours at 150° C., and then cooled to room temperature.

Example 10 was prepared according to the same procedure except molten BZ-1 (2.31 g; 0.01 mol) at 30° C. and sulfur (0.032 g; 0.01 mol) were used.

Example 11 was prepared by mixing molten BZ-3 (2.24 g; 0.01 mol) at 30° C. with sulfur (0.32 g; 0.01 mol), allowing the mixture to react at 200° C. for 1 min, and then cooling to room temperature.

Solutions of each of the reaction products of Examples 9-11 were prepared by dissolving the cooled products in deuterated chloroform at a concentration of 0.3 grams per liter (g/l). The solutions were used to determine $^{3}C$ and $^{1}H$ NMR spectra.

At compositions of 1:1 molar ratios broadened cure exotherm peaks along with a dramatic decrease of released energy therein, suggested that other phenomena occurred in addition to sulfur's catalytic role in benzoxazine ring opening. When a similar composition was analyzed via proton NMR short reaction times, e.g., 1 minute at 200° C., the peaks corresponding to the oxazine protons (2 at 5.3 ppm and 2 at 4.6) were halved in intensity, but only a quarter of the expected ring-opened polymeric product was observed in the 3.5 to 4.5 ppm region. At the same time appreciable formation of formaldehyde was observed (8.5 ppm), and formaldehyde was an anticipated product of the benzoxazine ring decomposition. At these compositions, it appeared that sulfur tended to decompose the benzoxazine ring as much as polymerize it.

When the sulfur to benzoxazine ratio was decreased, and the reaction was allowed to proceed under milder conditions most of the oxazine protons were for as being converted into a ring-opened polymeric structure. Furthermore, the multitude of peaks attributable to the same structural feature and their broadening both suggest that the product is not dimeric in nature, but rather (oligo)- and poly-meric.

Examples 12-18

Finely ground powders of BZ-1 and selenium disulfide, in the molar ratios and amounts shown in Table 3, were mixed together, and then stirred and shaken for approximately 1 minute in a Wig-L-Bug shaker. The approximate amount (DSC Amt) of each mixture in the table was heated up to 300° C. in a DSC (TA). Data from the DSC traces are shown in Table 2 and 3.

TABLE 2

| Example | BZ-1:SeS$_2$ Ratio | BZ-1 (g) | BZ-1 (mol) | SeS$_2$ (g) | SeS$_2$ (mol) | DSC Amt (mg) | Peak (° C.) | Onset (° C.) | Energy (J/g) |
|---|---|---|---|---|---|---|---|---|---|
| C1 | BZ-1only | — | — | 0 | 0 | 4.4 | 240 | 229 | 323 |
| 12 | 20X | 23.1 | 0.1 | 0.715 | 0.005 | 4.33 | 235 | 217 | 240 |
| 13 | 10X | 23.1 | 0.1 | 1.43 | 0.010 | 0.64 | 224 | 194 | 356 |
| 14 | 5X | 11.55 | 0.05 | 1.43 | 0.010 | 1.66 | 229 | 202 | 204 |
| 15 | 3.33X | 23.1 | 0.1 | 4.29 | 0.030 | 2.61 | 231 | 206 | 168 |
| 16 | 2.5X | 23.1 | 0.1 | 5.72 | 0.040 | 5.09 | 205 | 179 | 131 |
| 17 | 2X | 2.31 | 0.01 | 0.715 | 0.005 | 2.84 | 205 | 177 | 88 |
| 18 | 1:1 | 2.31 | 0.01 | 1.43 | 0.010 | 2.27 | 201 | 168 | 62 |

Examples 19-20

Figure 2:
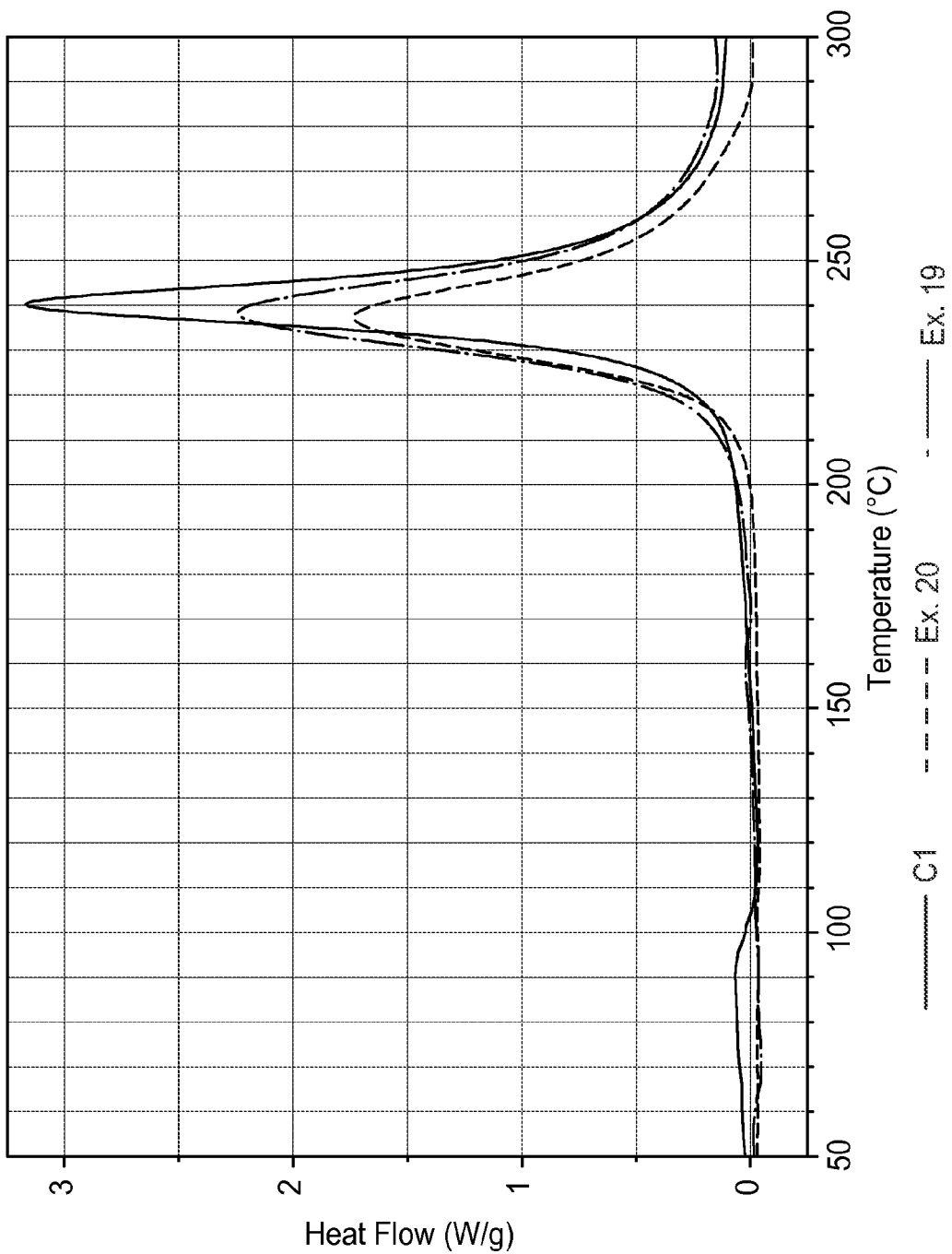
FIG. 2 shows DSC scans depicting elemental selenium catalyzed cure of benzoxazine and the effect of the benzoxazine to selenium ratio on the cure profile of Comparative Example 1 and Examples 19-20.

Finely ground powders of BZ-1 and selenium, in the amounts shown in Table 3, were mixed as described in Example 12. An approximate amount (DSC Amt) of each mixture was heated up to 320° C. in a DSC (TA). The DSC trace results are shown in Table 3 and FIG. 2.

TABLE 3

| Ex | BZ-1:Se Ratio | BZ-1 (g) | BZ-1 (mol) | Se (g) | Se (mol) | DSC Amt (mg) | Peak (° C.) | Onset (° C.) | Energy (J/g) |
|---|---|---|---|---|---|---|---|---|---|
| C1 | BZ-1 | — | — | 0 | 0 | 4.4 | 240 | 229 | 323 |
| 19 | 20X | 2.31 | 0.01 | 0.04 | 0.0005 | 4.62 | 238 | 226 | 345 |
| 20 | 4X | 2.31 | 0.1 | 0.198 | 0.0025 | 5.14 | 237 | 222 | 302 |

The peak exotherm temperature (Peak), cure onset temperature (Onset) and the energy released during curing (Energy) are shown in Table 4 to illustrate the effects of the catalyst in compositions have varying BZ-1:catalyst ratios.

TABLE 4

| BZ-1:Catalyst Ratio | Peak Temperature (° C.) | | | Onset Temperature (° C.) | | | Energy (J/g) | | |
|---|---|---|---|---|---|---|---|---|---|
| | S | SeS$_2$ | Se | S | SeS$_2$ | Se | S | SeS$_2$ | Se |
| No Catalyst | 240 | 240 | 240 | 229 | 229 | 229 | 344 | 344 | 344 |
| 20X | — | 235 | 239 | — | 217 | 226 | NT | 245 | 345 |
| 10X | 234 | 224 | — | 220 | 194 | — | 485 | 356 | — |
| 5X | 232 | 229 | — | 213 | 202 | — | 403 | 204 | — |
| 4X | — | — | 237 | — | — | 222 | — | — | 303 |
| 3.33X | 230 | 231 | — | 204 | 206 | — | 258 | 168 | — |
| 2.5X | 230 | 205 | — | 208 | 179 | — | 208 | 131 | — |
| 2X | 227 | 205 | — | 180 | 177 | — | 292 | 88 | — |
| 1:1 | 198 | 201 | — | 171 | 168 | — | 198 | 62 | — |

Examples 21-22

In Example 21, a mixture of 2.24 grams (0.01 mol) of BZ-3 and 0.014 g (0.0001 mol) of SeS$_2$ was heated in an oven at 150° C. for 2 hours, and then allowed to cool to room temperature.

In Example 22, a mixture of 2.24 grams (0.01 mol) of BZ-3 and 0.008 g (0.0001 mol) of Se was heated in an oven set at 220° C. for 2 hours and then allowed to cool to room temperature.

Each reaction product was dissolved in deuterated chloroform. For each composition, $^{77}$Se NMR data were collected from an NMR spectrometer. The data showed only baseline which suggests that the selenium was not incorporated into the polymer chain and that it acted as a catalyst.

Examples 23-24

Comparative Example C3

Compositions shown in Table 5 were prepared by adding milled nitrile rubber and a curable resin (BZ-1 or phenolic) to 16 oz. glass jar and then adding solvents (MEK, MPK/MIBK, and toluene) to dissolve the rubber and the resins. The glass jars were placed on the roller mixer and allowed to mix continuously overnight. After complete dissolution of rubber and the resins, powders (sulfur, zinc oxide and Curative). were added and dispersed with using a high speed dispersion mixer for approximately 15 min. The resulting mixture was knife coated onto a release coated paper liner at wet thickness of approximately 10 mils. The coated adhesive was allowed to dry at room temperature (75° F.) overnight followed by 30 min in an oven set at 180° F. The dry adhesive film thickness was approximately 6 mils and the adhesives were tested according to the above procedure for Overlap Shear Strength at 24° C. Results are shown in Table 6.

TABLE 5

| Composition | Example 23 (grams) | Example 24 (grams) | Example C3 (grams) |
|---|---|---|---|
| Nitrile rubber | 46 | 46 | 46 |
| Zinc oxide | 2.25 | 2.25 | 2.25 |
| Curative | 0.7 | 0.7 | 0.7 |
| Sulfur (S8) | 7.5 | 15 | 2.8 |
| Phenolic Resin | 0 | 0 | 118.4 |
| BZ-1 | 50 | 50 | 0 |
| MEK | 100 | 100 | 100 |
| MPK/MIBK | 50 | 50 | 50 |
| Toluene | 20 | 20 | 20 |

TABLE 6

| Example | Resin | Sulfur (wt %) | OLS$_{avg}$ | OLS$_{max}$ | OLS$_{sdev}$ |
|---|---|---|---|---|---|
| 23 | BZ-1 | 7 | 3704 | 3992 | 253 |
| 24 | BZ-1 | 13.2 | 1767 | 2332 | 372 |
| C3 | Phenolic | 1.6 | 3854 | 3954 | 265 |

Examples 25-26

Two molten solutions were prepared by heating BZ-1 (23.1 grams; 0.1 mol) and sulfur (0.1 g) to 100° C. Then HOTBN (7 g and 2 grams) were heated to 100° C. and added to each molten BZ-1/sulfur solution to form 23% and 8% HOTBN compositions for Example 25 and 26, respectively. The composition was stirred into a homogenous mass using a high speed shear mixer (DAC Speed Mixer, Model 400-FVZ) for 30 seconds at 3000 rpm while hot. The hot mixture was used to prepare samples for Dynamic Mechanical Analysis described above. The DMA traces showed broad viscoelastic regions indicating that the cured compositions would be useful as toughened thermoset adhesives and vibration damping compositions.

Examples 27-28

The compositions of Examples 25 and 26 were knife coated while hot between two silicone release-coated PET liners to form approximately 125 micrometer thick films for Examples 27-28 respectively. The knife coater was set at 100° C. The film was tested for Overlap Shear (OLS) and Floating Roller Peel (FRP) according to test methods described above. Test results are shown in Table 7

TABLE 7

| Ex | HOTBN (wt %) | Overlap Shear - 24° C. (psi) | | | Overlap Shear - 136° C. (psi) | | | FRP Peel (Lbs/inch width) | | |
|---|---|---|---|---|---|---|---|---|---|---|
| | | OLS$_{avg}$ | OLS$_{max}$ | OLS$_{sdev}$ | OLS$_{avg}$ | OLS$_{max}$ | OLS$_{sdev}$ | Peel$_{avg}$ | Peel$_{max}$ | Peel$_{dev}$ |
| 27 | 23 | 1027 | 1153 | 114 | 397 | 431 | 34 | 20.4 | 21.9 | 1.5 |
| 28 | 8 | 1482 | 1554 | 104 | 1143 | 1210 | 69 | 14.3 | 16.2 | 2.2 |

Examples 29-30

Finely ground powders of BZ-1 (1 g; 0.0044 mol) and sulfur (0.01 g) were stirred vigorously. Then 1 gram of HOTBN was added and stirred with a spatula by hand into a homogenous mass. Approximately 17.54 mg of the mixture was used for DSC analysis.

Example 30 was prepared in the same manner except that 0.5 g of HOTBN was added instead of 1 g, and approximately 13.51 mg were used for DSC analysis.

DSC results are shown in Table 8 and compared with Example 3 without HOTBN.

TABLE 8

| Example | HOTBN (wt %) | Onset (° C.) | Peak (° C.) | Energy (J/g) |
|---|---|---|---|---|
| 29 | 50 | 237 | 256 | 115 |
| 30 | 33 | 232 | 249 | 167 |
| 3 | 0 | 220 | 234 | 484 |

Examples 31-33

Finely ground powders of BZ-1 (1 g; 0.0044 mol) and sulfur (0.01 g) were vigorously stirred together for Examples 31-33. ATBN was added in amounts of 0.275 g, 0.5 g, and 1.0 g to each example, respectively and stirred by hand with a spatula to form a homogenous mass. Approximately 13.51 mg from each example were used for DSC analysis with results shown in Table 9. The traces for Examples 31-33 showed 2 peaks with a one at lower temperatures. The lower temperature indicates the onset, peak, and energy released during the curing of the amine from ATBN with benzoxazine. The sulfur cure showed higher temperatures and energy release.

TABLE 9

| | | Amine Cure | | | Sulfur Cure | | |
|---|---|---|---|---|---|---|---|
| Ex | ATBN (wt %) | Onset (° C.) | Peak (° C.) | Energy (J/g) | Onset (° C.) | Peak (° C.) | Energy (J/g) |
| 31 | 23 | 109 | 123 | 9.5 | 198 | 227 | 216 |
| 32 | 33 | 103 | 123 | 10.0 | 191 | 226 | 185 |
| 33 | 50 | 102 | 121 | 19.3 | 145 | 228 | 121 |
| 3 | 0 | — | — | — | 220 | 234 | 485 |

Examples 34-40

Compositions were prepared by heating ATBN to 100° C. and adding it to a molten solution of BZ-1 and sulfur in the amounts shown in Table 10. The silica (Cab-O-Sil) then was added and the mixture was stirred into a homogenous mass using a high speed shear mixer (DAC)) for 30 seconds at 3000 rpm while hot.

While hot, part of the composition for Examples 34, 35, 39, and 40 were used to prepare test coupons for DMA testing. The data from the DMA scan indicate that the ATBN rubber reained miscible with the benzoxazines through a wide range of compositions and thermal cycling. The morphological properties indicate that the compatibility of the ATBN with benzoxazine gave high glass transitions temperatures over a broad range of temperatures which are characteristic of tough high modulus compositions with good thermal stability.

The remainder of each composition for Examples 34-38, while still hot was coated between two silicone release-coated PET films using a knife coater set at 100° C. to form to 125 micrometer-thick films. The films were allowed to cool to room temperature and then used to prepare test samples for Overlap Shear and Floating Roller Peel adhesion as described above.

Test samples for Overlap Shear and Floating Roller Peel were prepared from the coated adhesive films from Examples 34-36. The test samples were cured in an oven set at 180° C. for 2 hours.

Test samples for Overlap Shear prepared from the coated films of Examples 37-38 were cured in an autoclave at 150° C. for 2 hours and then tested as in Examples 34-36. Test results are shown in Table 11 for Overlap Shear and Table 12 for Floating Roller Peel.

TABLE 10

| Ex | ATBN (wt %) | BZ-1 (g - mol) | Sulfur (g) | ATBN (g) | Silica (g) |
|---|---|---|---|---|---|
| 34 | 18 | 23.1-0.1 | 0.1 | 5 | 0.9 |
| 35 | 23 | 23.1-0.1 | 0.1 | 7 | 0.9 |
| 36 | 50 | 23.1-0.1 | 0.1 | 23.1 | 1.4 |
| 37 | 18 | 23.1-0.1 | 0.2 | 5 | 0.9 |
| 38 | 23 | 23.1-0.1 | 0.2 | 7 | 0.9 |
| 39 | 11 | 23.1-0.1 | 0.1 | 3 | 0 |
| 40 | 9 | 23.1-0.1 | 0.1 | 2 | 0 |

TABLE 11

| | ATBN | Overlap Shear-24° C. (psi) | | | Overlap Shear-136° C. (psi) | | | Overlap Shear-177° C. (psi) | | |
|---|---|---|---|---|---|---|---|---|---|---|
| Ex | (wt %) | $OLS_{avg}$ | $OLS_{max}$ | $OLS_{sdev}$ | $OLS_{avg}$ | $OLS_{max}$ | $OLS_{sdev}$ | $OLS_{avg}$ | $OLS_{max}$ | $OLS_{sdev}$ |
| 34 | 18 | 3302 | 3705 | 200 | 2078 | 2387 | 230 | — | — | — |
| 35 | 23 | 4274 | 4335 | 60 | 1794 | 1929 | 89 | — | — | — |
| 36 | 50 | 3864 | 4072 | 124 | 1280 | 1343 | 61 | — | — | — |
| 37 | 18 | 1538 | 1624 | 131 | Fail | Fail | Fail | 299 | 359 | 60 |
| 38 | 23 | 2472 | 2608 | 96 | 591 | 702 | 61 | 360 | 390 | 25 |

—Not tested

TABLE 12

| Ex | ATBN (wt %) | Floating Roller Peel (piw) | | |
|---|---|---|---|---|
| | | Peel$_{avg}$ | Peel$_{max}$ | Peel$_{dev}$ |
| 34 | 18 | 22.3 | 23.0 | 0.92 |
| 35 | 23 | 30.8 | 31.7 | 0.51 |
| 36 | 50 | 30.3 | 39.3 | 0.82 |
| 37 | 18 | Fail | Fail | Fail |
| 38 | 23 | 7.6 | 9.7 | 2.0 |

Overlap Shear test samples for Examples 37-39 were also cured in a 180° C. oven for 2 hours and allowed to cool to room temperature. Samples were stored at room temperature until tested at room temperature and at 136° C. A third set of samples was tested at 177° C. after annealing the samples for one week at 177° C. Test results are shown in Table 13.

TABLE 13

| Ex | ATBN (wt %) | Overlap Shear-24° C. (psi) | | | Overlap Shear-136° C. (psi) | | | Overlap Shear-177° C. (psi) | | |
|---|---|---|---|---|---|---|---|---|---|---|
| | | OLS$_{avg}$ | OLS$_{max}$ | OLS$_{sdev}$ | OLS$_{avg}$ | OLS$_{max}$ | OLS$_{sdev}$ | OLS$_{avg}$ | OLS$_{max}$ | OLS$_{sdev}$ |
| 37 | 18 | 2806 | 2945 | 88 | 709 | 786 | 56 | 1231 | 1416 | 100 |
| 38 | 23 | 2918 | 3342 | 267 | 771 | 959 | 106 | 1319 | 1526 | 158 |
| 39 | 21 | 3076 | 3496 | 256 | 794 | 945 | 86 | 1125 | 1272 | 92 |

The thermal stability of the composition of Example 39 was determined using Thermogravimetric Analysis in air as described above using about 5-10 g of sample. Arrhenius plots were used to determine the activation energies of Example 39 shown in Table 14. For comparison, Example C4 (BZ-1 homopolymerized) and C5 (BZ-1 cured with TMMP were tested in the same way. The compositions were polymerized as in copending applications U.S. 2010/0312004 and U.S. 2010/0307680 (Gorodisher et al).

TABLE 14

| Weight Loss in Air (%) | Activation Energy of Thermal Decomposition (joules/mol) | | |
|---|---|---|---|
| | Example 39 | Example C4 | Example C5 |
| 10 | 256 | — | 159 |
| 5 | 244 | 137 | 133 |
| 2.5 | 215 | 146 | 112 |

The data in Table 14 show higher activation energies are needed for thermal decomposition of the compositions of the invention and thus the superior thermal stability of the inventive compositions.

Example 41

A molten composition was prepared according to the procedure described in Examples 25-26 except with the following composition: BZ-1 (138.6 grams; 0.6 mol), sulfur (0.78 g) and ATBN (18 g). The hot composition was poured into a heated mold to determine the Shrinkage after curing as described above. The shrinkage of the polymerized composition was 0.83%.

Examples 42-46

Compositions were prepared by thoroughly mixing together a finely ground powder of BZ-1 (23.1 grams; 0.1 mol) and the amounts of phosphorus sesquisulfide ($P_4S_3$) powder shown in Table 14. Samples (3 to 10 mg) were each heated at 10° C./min in a DSC up to 330° C. The results from the DSC traces of the peak exotherm temperature, the onset of cure temperature, and the energy released during curing are shown in Table 15.

Figure 3:
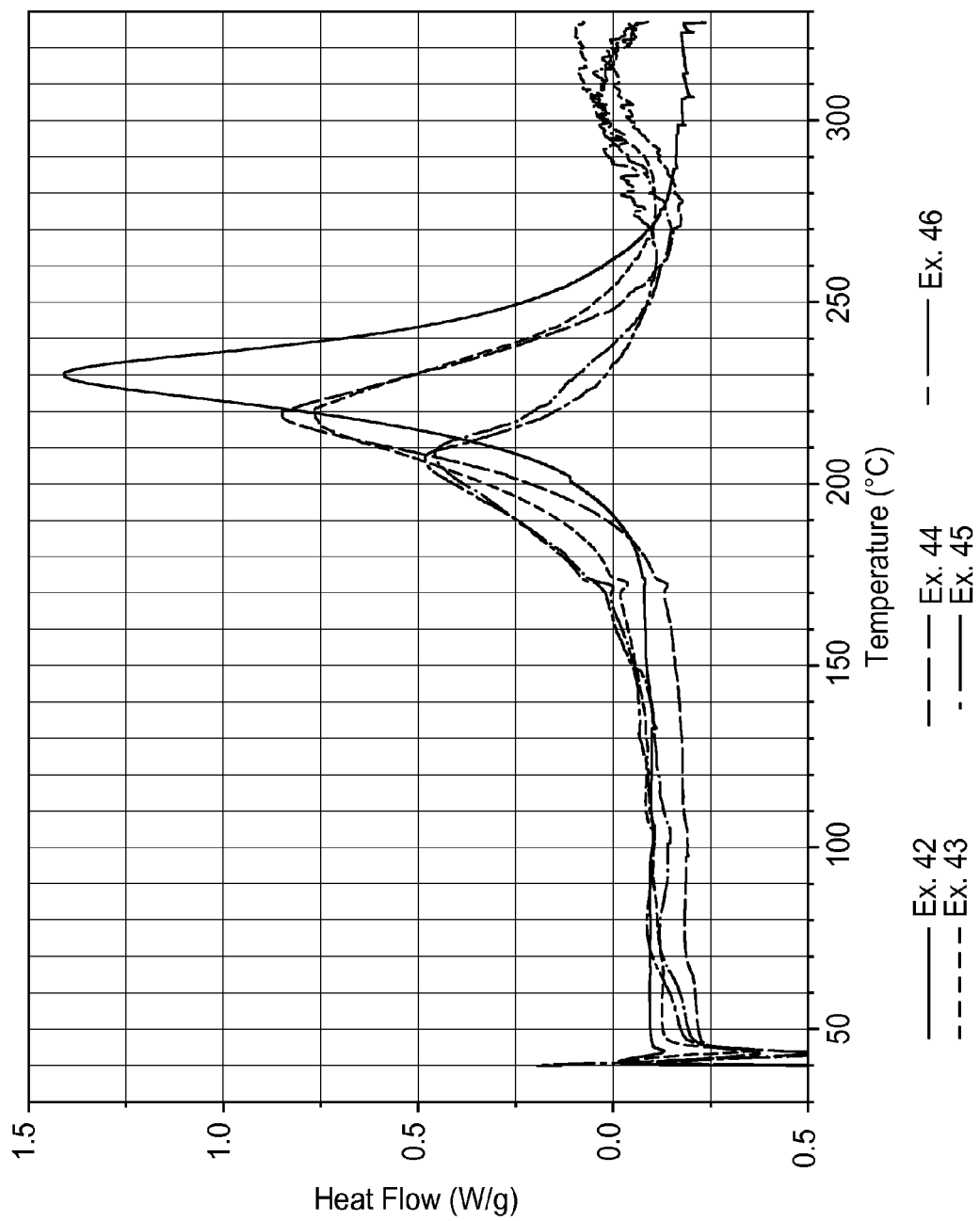
FIG. 3 shows DSC scans depicting phosphorus sesquisulfide catalyzed cure of benzoxazine and the effect of the benzoxazine to phosphorus sesquisulfide ratio on the cure profile of Comparative Example 1 and Examples 42-46.

Table 15 and FIG. 3.

| Ex | $P_4S_3$ (grams) | BZ:$P_4S_3$ Molar Ratio | Peak (° C.) | Onset (° C.) | Energy (J/g) |
|---|---|---|---|---|---|
| CE 1 | — | BZ-1 only | 240 | 229 | 323 |
| 42 | 2.2 | 10X | 230 | 207 | 300 |
| 43 | 4.4 | 5X | 220 | 188 | 230 |
| 44 | 5.5 | 4X | 220 | 193 | 224 |
| 45 | 7.36 | 3X | 209 | 166 | 167 |
| 46 | 11.01 | 2X | 207 | 170 | 151 |

The catalytic effects of the two sulfide catalysts ($P_4S_3$ and $SeS_2$) are shown in Table 16.

TABLE 16

| BZ1:catalyst Ratio | Peak (° C.) | | Onset (° C.) | | Energy (J/g) | |
|---|---|---|---|---|---|---|
| | $SeS_2$ | $P_4S_3$ | $SeS_2$ | $P_4S_3$ | $SeS_2$ | $P_4S_3$ |
| 10X | 224 | 230 | 194 | 207 | 356 | 300 |
| 5X | 229 | 220 | 202 | 188 | 204 | 224 |
| 3.33X | 231 | — | 206 | — | 168 | — |
| 3X | — | 209 | — | 166 | — | 167 |
| 2.5X | 205 | — | 179 | — | 131 | — |
| 2X | 205 | 207 | 177 | 170 | 88 | 151 |

This disclosure provides the following illustrative embodiments.

1. A polymerizable composition comprising:
   a) a benzoxazine, and
   b) a catalyst selected from elemental sulfur, elemental selenium, and sulfides or selenides of Group V or VI elements.
2. The polymerizable composition of embodiment 1 comprising 0.1 to 10 mole percent of said catalyst.
3. The polymerizable composition of any of the previous embodiments further comprising a toughening agent.

4. The polymerizable composition of any of the previous embodiments, wherein said toughening agent is present at between about 3% and 35% by weight of the benzoxazine.

5. The polymerizable composition of any of the previous embodiments, wherein said toughening agent is a polymeric compound having both a rubbery phase and a thermoplastic phase.

6. The polymerizable composition of embodiment 5, wherein said toughening agent is a graft polymer having a polymerized, diene, rubbery core and a shell grafted thereto of an acrylic acid ester, a methacrylic acid ester, a monovinyl aromatic hydrocarbon, or a mixture thereof.

7. The polymerizable composition of embodiment 6, wherein said rubbery core comprises polymerized butadiene or a polymerized mixture of butadiene and styrene.

8. The polymerizable composition of embodiment 6, wherein said shell comprises a methacrylic acid ester.

9. The polymerizable composition of embodiment 8, wherein said methacrylic acid ester comprises a lower alkyl substituted methacrylate.

10. The polymerizable composition of embodiment 6, wherein said shell comprises a monovinyl aromatic hydrocarbon.

11. The polymerizable composition of embodiment 10, wherein said monovinyl aromatic hydrocarbon is selected from styrene, alpha-methylstyrene, vinyltoluene, vinylxylene, ethylvinylbenzene, isopropylstyrene, chlorostyrene, dichlorostyrene, and ethylchlorostyrene.

12. The polymerizable composition of embodiment 6, wherein said toughening agent is a core-shell polymer wherein the core is a rubbery polyacrylate polymer having a glass transition temperature below about 0° C. and the shell is grafted thereto and is a thermoplastic polyacrylate polymer having a glass transition temperature above about 25° C.

13. The polymerizable composition of embodiment 12, wherein said core is selected from polybutylacrylate and polyisooctylacrylate and said shell is polymethylmethacrylate.

14. The polymerizable composition of embodiment 6, wherein said toughening agent is an elastomeric particle having a $T_g$ below about 25° C. that is a polymerized mixture of free-radical polymerizable monomers and a polymeric stabilizer that is soluble in the polymerizable composition.

15. The polymerizable composition of any of the previous embodiments, wherein the toughening agent comprises nucleophilic reactive groups that ring-opening a portion of the benzoxazine.

16. The polymerizable composition of any of the previous embodiments comprising a mixture of benzoxazines derived from both aliphatic and aryl amines.

17. The polymerizable composition of any of the previous embodiments comprising a benzoxaxines derived from poly(alkyleneoxy) diamines.

18. The polymerized composition of any of the previous embodiments comprising one or more polymers of the formula:

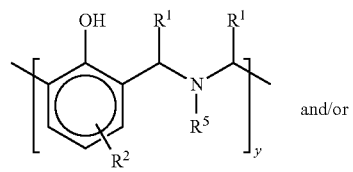

and/or

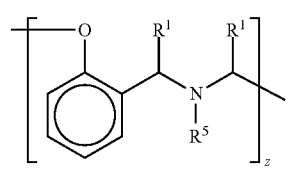

each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound, $R^5(NH_2)_m$, where m is 1-4; and
y+z is at least 2, and
the residue of the catalyst.

19. The polymerized composition of embodiment 18, wherein $R^5$ is a poly(alkyleneoxy) group.

20. The polymerized composition of embodiment 18, wherein $R^5$ comprises a mixture of aryl groups and aliphatic groups.

21. The polymerizable composition of any of the previous embodiments, further comprising a reactive diluent.

22. The polymerizable composition of embodiment 21 wherein the reactive diluent is of the formula:

$$R^8\text{—}(ZH)_p,$$

where
$R^8$ is the (hetero)hydrocarbyl group,
Z is a mixture of —S— or —$NR^9$, where each $R^9$ is H or a hydrocarbyl group, and
p is 1 to 6.

23. The polymerizable composition of embodiment 22, wherein the ratio of the sum of amine and/or thiol groups from the compound $R^8\text{—}(ZH)_p$, to the benzoxazine groups is about 3:1 to 100:1.

24. The polymerizable composition of any of the previous embodiments, further comprising a film-forming polymer or oligomer.

25. The polymerizable composition of embodiment 24, wherein the film-forming polymer in amounts of 1 to 75 wt %, relative to the benzoxazine.

26. The polymerizable composition of any of the previous embodiments further comprising an epoxy resin.

What is claimed is:
1. A polymerizable composition comprising:
a) a benzoxazine, and
b) a catalyst selected from elemental sulfur, elemental selenium, and sulfides or selenides of Group V or VI elements.

2. The polymerizable composition of claim 1 comprising 0.1 to 10 mole percent of said catalyst.

3. The polymerizable composition of claim 1 further comprising a toughening agent.

4. The polymerizable composition of claim 1, wherein said toughening agent is present at between about 3% and 35% by weight of the benzoxazine.

5. The polymerizable composition of claim 1, wherein said toughening agent is a polymeric compound having both a rubbery phase and a thermoplastic phase.

6. The polymerizable composition of claim 5, wherein said toughening agent is a graft polymer having a polymerized, diene, rubbery core and a shell grafted thereto of an acrylic acid ester, a methacrylic acid ester, a monovinyl aromatic hydrocarbon, or a mixture thereof.

7. The polymerizable composition of claim 6, wherein said rubbery core comprises polymerized butadiene or a polymerized mixture of butadiene and styrene.

8. The polymerizable composition of claim 6, wherein said shell comprises a methacrylic acid ester.

9. The polymerizable composition of claim 8, wherein said methacrylic acid ester comprises a $C_1$-$C_4$ alkyl substituted methacrylate.

10. The polymerizable composition of claim 6, wherein said shell comprises a monovinyl aromatic hydrocarbon.

11. The polymerizable composition of claim 10, wherein said monovinyl aromatic hydrocarbon is selected from styrene, alpha-methylstyrene, vinyltoluene, vinylxylene, ethylvinylbenzene, isopropylstyrene, chlorostyrene, dichlorostyrene, and ethylchlorostyrene.

12. The polymerizable composition of claim 5, wherein said toughening agent is a core-shell polymer wherein the core is a rubbery polyacrylate polymer having a glass transition temperature below about 0° C. and the shell is grafted thereto and is a thermoplastic polyacrylate polymer having a glass transition temperature above about 25° C.

13. The polymerizable composition of claim 12, wherein said core is selected from polybutylacrylate and polyisooctylacrylate and said shell is polymethylmethacrylate.

14. The polymerizable composition of claim 6, wherein said toughening agent is an elastomeric particle having a $T_g$ below about 25° C. that is a polymerized mixture of free-radical polymerizable monomers and a polymeric stabilizer that is soluble in the polymerizable composition.

15. The polymerizable composition of claim 6, wherein the toughening agent comprises nucleophilic reactive groups that may ring open a portion of the benzoxazine.

16. The polymerizable composition of claim 1 comprising a mixture of benzoxaxines derived from both aliphatic and aryl amines.

17. The polymerizable composition of claim 1 comprising a benzoxaxines derived from poly(alkyleneoxy) diamines.

18. The polymerized composition of claim 1 comprising one or more polymers of the formula:

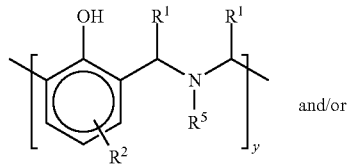

and/or

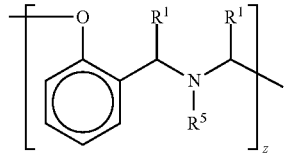

each $R^1$ is H or an alkyl group, and is the residue of an aliphatic aldehyde, $R^2$ is H, a covalent bond, or a polyvalent (hetero)hydrocarbyl group;

$R^5$ is the (hetero)hydrocarbyl residue of a primary amino compound, $R^5(NH_2)_m$, where m is 1-4; and y+z is at least 2, and the residue of the catalyst.

19. The polymerized composition of claim 18, wherein $R^5$ is a poly(alkyleneoxy) group.

20. The polymerized composition of claim 18, wherein $R^5$ comprises a mixture of aryl groups and aliphatic groups.

21. The polymerizable composition of claim 1, further comprising a reactive diluent.

22. The polymerizable composition of claim 21 wherein the reactive diluent is of the formula:

$R^8$—$(ZH)_p$, where $R^8$ is the (hetero)hydrocarbyl group,

Z is —S— or —$NR^9$, where each $R^9$ is H or a hydrocarbyl group, and p is at least 2.

23. The polymerizable composition of claim 22, wherein the ratio of the sum of amine or thiol groups from the compound $R^8$—$(ZH)_p$, to the benzoxazine groups is about 3:1 to 100:1.

24. The polymerizable composition of claim 1, further comprising a film-forming polymer or oligomer.

25. The polymerizable composition of claim 24, wherein the film-forming polymer is present in amounts of 1 to 75 wt %, relative to the benzoxazine.

26. The polymerizable composition of claim 1 further comprising an epoxy resin.

* * * * *